United States Patent
Arentz

(10) Patent No.: US 9,213,969 B2
(45) Date of Patent: Dec. 15, 2015

(54) TRANSMITTER, RECEIVER, TRANSMITTING METHOD, RECEIVING METHOD, COMMUNICATION SYSTEM, COMMUNICATION METHOD, PROGRAM, AND COMPUTER-READABLE STORAGE MEDIUM

(71) Applicant: Rakuten, Inc., Shinagawa-ku, Tokyo (JP)

(72) Inventor: Will Archer Arentz, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/131,908

(22) PCT Filed: Oct. 24, 2012

(86) PCT No.: PCT/JP2012/077466
§ 371 (c)(1),
(2) Date: Jan. 10, 2014

(87) PCT Pub. No.: WO2013/062000
PCT Pub. Date: May 2, 2013

(65) Prior Publication Data
US 2014/0201069 A1    Jul. 17, 2014

(30) Foreign Application Priority Data
Oct. 28, 2011  (JP) .................................. 2011-238024

(51) Int. Cl.
*H04L 27/00*    (2006.01)
*G06Q 20/22*    (2012.01)
(Continued)

(52) U.S. Cl.
CPC .............. *G06Q 20/22* (2013.01); *G10L 19/018* (2013.01); *H04B 11/00* (2013.01); *H04M 11/066* (2013.01); *H04L 63/0492* (2013.01); *H04W 12/02* (2013.01)

(58) Field of Classification Search
CPC ...... G06Q 20/22; H04B 11/00; G10L 19/018; H04L 63/0492; H04W 12/02
USPC ......... 375/260, 267, 295, 316, 343; 455/41.1, 455/567; 370/493, 494; 705/39, 44
See application file for complete search history.

(56) References Cited

U.S. PATENT DOCUMENTS 6,076,063 A    6/2000    Unno et al.
7,848,358 B2   12/2010   LaDue
(Continued)

FOREIGN PATENT DOCUMENTS

EP    1603062 A1     12/2005
JP    62-015958 A    1/1987
(Continued)

OTHER PUBLICATIONS

English Translation of Written Opinion of the International Searching Authority for PCT/JP2012/077466 accompanied with PCT/IB/373 and PCT/IB/338 dated May 8, 2014, acting as concise explanation of previously submitted reference(s).
(Continued)

*Primary Examiner* — Dhaval Patel
(74) *Attorney, Agent, or Firm* — Hubbs, Enatsky & Inoue PLLC

(57) ABSTRACT

To provide a technique for making it possible to perform proximity communication using an apparatus not including a special proximity communication device. Transmission data is acquired. Output sound data of a PCM format obtained by encoding the transmission data is output, the output sound data indicating sound in an inaudible frequency band. A DA converter is caused to convert the output sound data, whereby a speaker is caused to output sound corresponding to the output sound data. The output sound data indicates sound having a plurality of sections with sound and soundless sections between the adjacent sections with sound according to the transmission data and that the output sound data indicates a sine curve in which the amplitude of the sections with sound increases from a start time and decreases after reaching a maximum.

21 Claims, 16 Drawing Sheets

(51) Int. Cl.
  *G10L 19/018* (2013.01)
  *H04B 11/00* (2006.01)
  *H04M 11/06* (2006.01)
  *H04L 29/06* (2006.01)
  *H04W 12/02* (2009.01)

(56) References Cited

U.S. PATENT DOCUMENTS

| | | |
|---|---|---|
| 2001/0055391 A1 | 12/2001 | Jacobs |
| 2004/0137929 A1 | 7/2004 | Jones et al. |
| 2005/0076219 A1 | 4/2005 | De Bot |
| 2005/0219068 A1 | 10/2005 | Jones et al. |
| 2006/0136544 A1 | 6/2006 | Atsmon et al. |
| 2007/0111763 A1* | 5/2007 | Bylsma ............ 455/567 |
| 2009/0070104 A1 | 3/2009 | Jones et al. |
| 2009/0132391 A1 | 5/2009 | Jacobs |
| 2010/0240297 A1 | 9/2010 | Jones et al. |
| 2013/0044873 A1* | 2/2013 | Etter ............ 379/406.12 |
| 2013/0203345 A1* | 8/2013 | Fisher ............ 455/41.1 |
| 2013/0253918 A1 | 9/2013 | Jacobs |

FOREIGN PATENT DOCUMENTS

| | | |
|---|---|---|
| JP | 63-178695 A | 7/1988 |
| JP | 10-293643 A | 11/1998 |
| JP | 11-154916 A | 6/1999 |
| JP | 11-353399 A | 12/1999 |
| JP | 2000-308153 A | 11/2000 |
| JP | 2001-023015 A | 1/2001 |
| JP | 2001-112033 A | 4/2001 |
| JP | 2002-252644 A | 9/2002 |
| JP | 2003-536094 A | 12/2003 |
| JP | 2004-272560 A | 9/2004 |
| JP | 2005-522058 A | 7/2005 |
| JP | 2008-042656 A | 2/2008 |
| JP | 2009-027722 A | 2/2009 |
| JP | 2009-094558 A | 4/2009 |
| WO | 2011/087970 A1 | 7/2011 |

OTHER PUBLICATIONS

Office Action for relating Japanese Patent Application No. 2011-178578 dated May 22, 2012.

Office Action for relating Japanese Patent Application No. 2011-178578 dated Mar. 6, 2012.

International Search Report for PCT/JP2012/077466 dated Feb. 5, 2013.

* cited by examiner

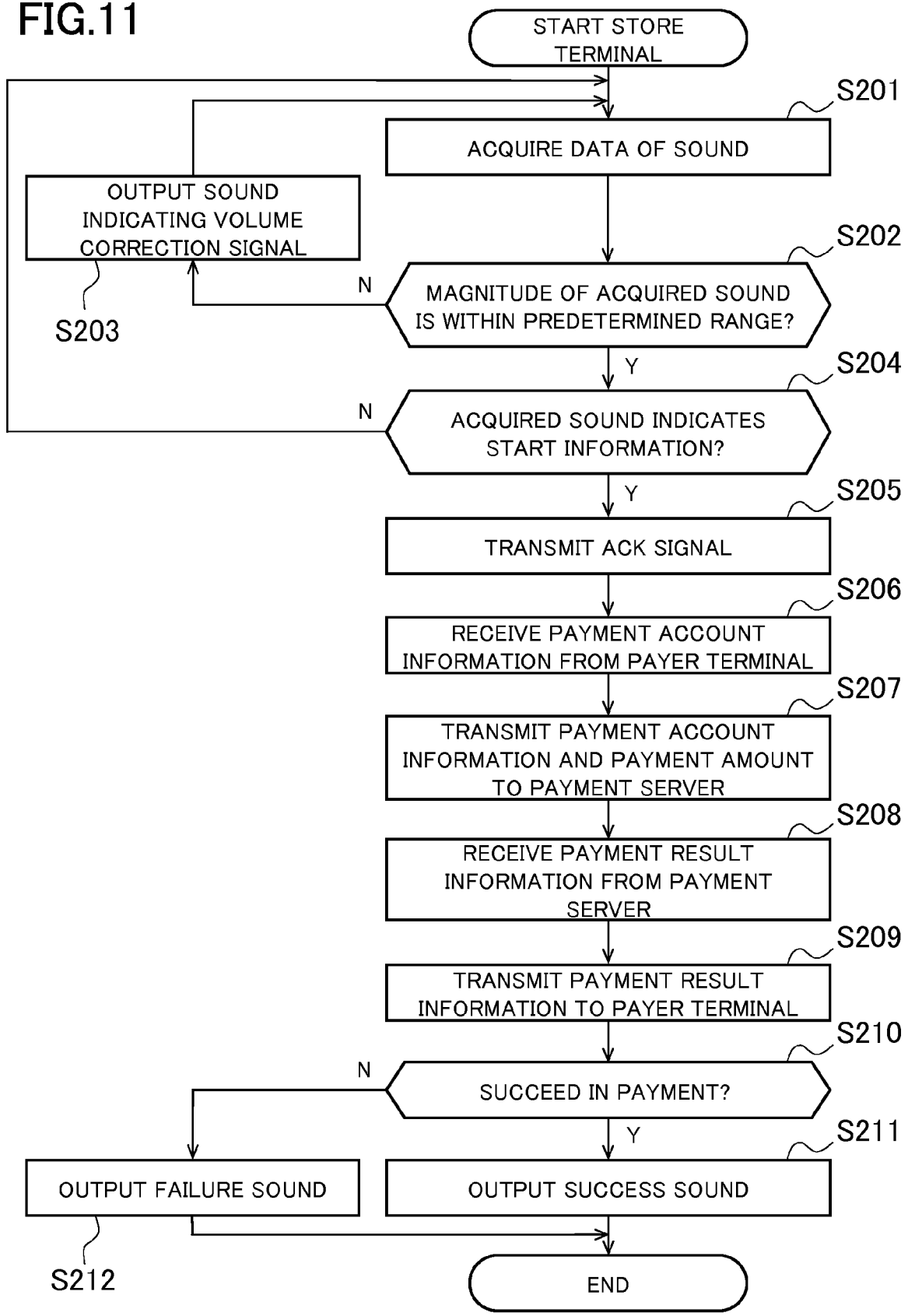

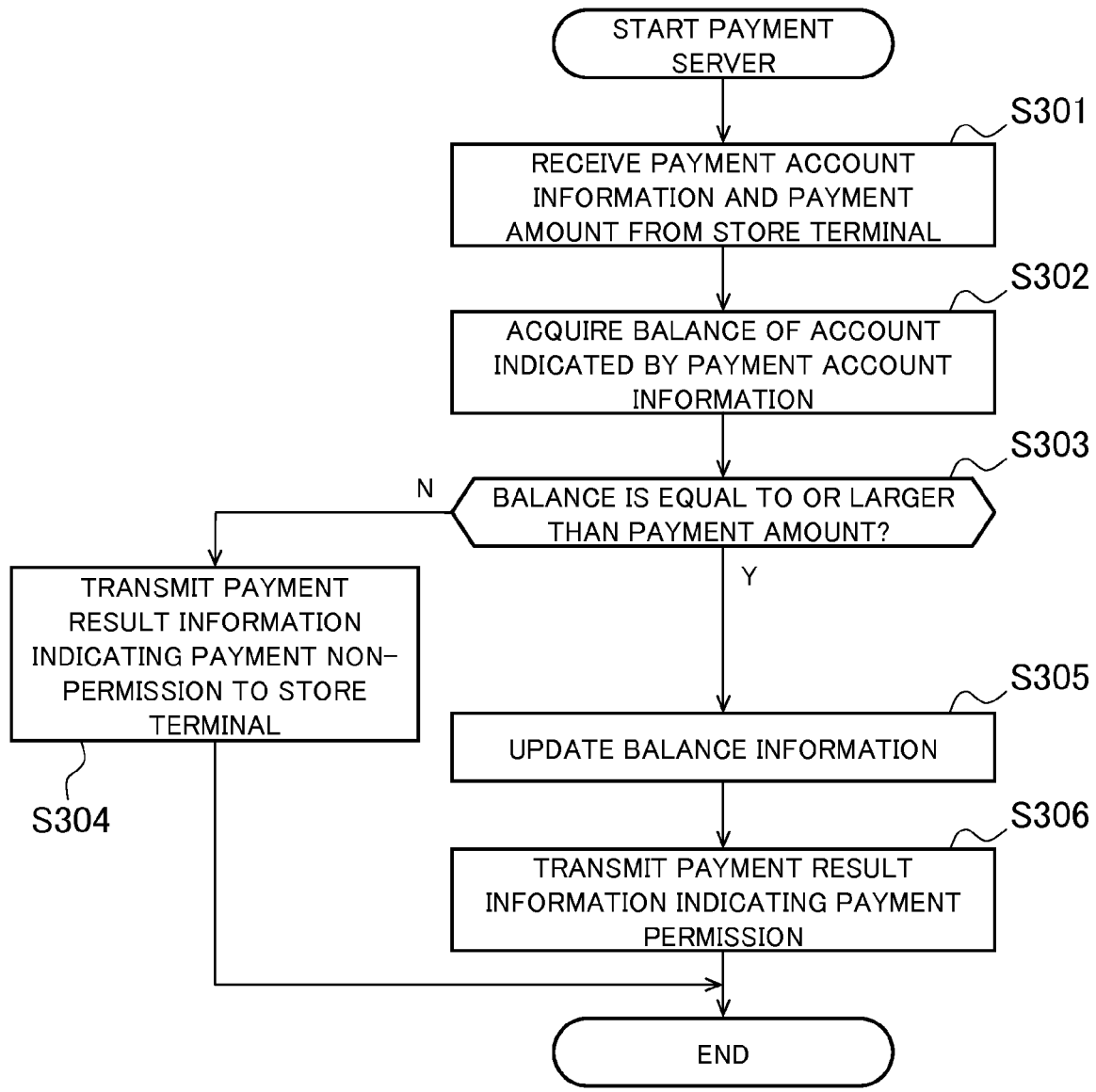

US 9,213,969 B2

TRANSMITTER, RECEIVER, TRANSMITTING METHOD, RECEIVING METHOD, COMMUNICATION SYSTEM, COMMUNICATION METHOD, PROGRAM, AND COMPUTER-READABLE STORAGE MEDIUM

CROSS REFERENCE TO RELATED APPLICATIONS

This application is a National Stage of International Application No. PCT/JP2012/077466 filed Oct. 24, 2012, claiming priority based on Japanese Patent Application No.2011-238024 filed on Oct. 28, 2011. The contents of each of the above documents are incorporated herein by reference in their entirety.

TECHNICAL FIELD

The present invention relates to a transmitter, a receiver, a transmitting method, a receiving method, a communication system, a communication method, a program, and a computer-readable storage medium.

BACKGROUND ART

In recent years, a technique for performing payment of electronic money using a card incorporating a noncontact IC chip is spreading. In order to make it more convenient to handle the electronic money, software is installed in a cellular phone including a noncontact IC chip, and the mobile terminal is used to pay in the form of the electronic money. The noncontact IC chip performs a proximity communication using a dedicated frequency band.

CITATION LIST

Patent Literature

Patent Literature 1: JP 2004-272560 A

SUMMARY OF INVENTION

Technical Problem

The number of mobile terminals incorporating noncontact IC chips is increasing. However, there are also many mobile terminals without noncontact IC chips such as most of smart phones and low-price cellular phones. This is related to the fact that the noncontact IC chip is dedicated hardware for communication that uses a radio waves. The presence of the mobile terminals without noncontact IC chips is an obstacle in spreading the use of electronic money payment performed using a mobile terminal. A user who owns a mobile terminal which does not include a noncontact IC chip and uses electronic money has to separately carry a noncontact IC card.

The present invention has been devised in view of these problems and it is an object of the present invention to provide a technique for making it possible to perform, even when a device such as a mobile terminal does not include hardware for proximity communication such as a noncontact IC chip, proximity communication using the device.

Solution to Problem

In order to solve the problems, a transmitter according to the present invention includes: means for acquiring transmission data; encoding means for outputting output sound data of a PCM format obtained by encoding the transmission data, the output sound data indicating sound in an inaudible frequency band; and sound output means for causing a DA converter to convert the output sound data so as to cause a speaker to output sound corresponding to the output sound data. The encoding means outputs the output sound data such that the output sound data indicates sound having a plurality of sections with sound and soundless sections between the adjacent sections with sound according to the transmission data and that the output sound data indicates a sine curve in which the amplitude of the sections with sound increases from a start time and decreases after reaching a maximum.

A receiver according to the present invention includes: sound input means for acquiring, via an AD converter, input sound data of a PCM format indicating sound in an inaudible frequency band input to a microphone and obtained by encoding transmission data, the sound having a plurality of sections with sound and soundless sections between the adjacent sections with sound according to the transmission data and wherein the sound indicates a sine curve in which the amplitude of the sections with sound increases from a start time and decreases after reaching a maximum; extracting means for generating extracted sound data obtained by extracting the sound in the inaudible frequency band from the sound indicated by the input sound data; and decoding means for decoding the transmission data based on the extracted sound data.

According to the present invention, since the apparatus including the DA converter and the speaker and the apparatus including the AD converter and the microphone are used, it is possible to perform communication even if dedicated hardware for proximity communication such as a noncontact IC chip is not used.

A mobile terminal according to the present invention includes: means for acquiring data indicating a payment account transmitted to a store terminal; encoding means for outputting output sound data of a PCM format obtained by encoding the data indicating the payment account; and sound output means for causing a DA converter to convert the output sound data so as to cause a speaker to output sound corresponding to the output sound data.

A store terminal according to the present invention includes: sound input means for acquiring, via an AD converter, input sound data of a PCM format indicating sound input to a microphone, the sound being obtained by encoding data indicating a payment account output by a mobile terminal; decoding means for decoding the data indicating the payment account based on the input sound data; payment inquiring means for transmitting the data indicating the payment account and a payment amount to a balance management apparatus; and result output means for outputting information indicating a result of payment based on information indicating propriety of payment received from the balance management apparatus.

A transmitting method according to the present invention includes: a step of acquiring data indicating a payment account transmitted to a store terminal; an encoding step of outputting output sound data of a PCM format obtained by encoding the data indicating the payment account; and an output step of causing a DA converter to convert the output sound data so as to cause a speaker to output sound corresponding to the output sound data.

A receiving method according to the present invention includes: an input step of acquiring, via an AD converter, input sound data of a PCM format indicating sound input to a microphone, the sound being obtained by encoding data indicating a payment account output by a mobile terminal; a decoding step of decoding the data indicating the payment account based on the input sound data; a payment inquiring step of transmitting the data indicating the payment account and a payment amount to a balance management apparatus; and a result output step of outputting information indicating a result of payment based on information indicating propriety of payment received from the balance management apparatus.

A program for a mobile terminal according to the present invention causes a computer to function as: means for acquiring data indicating a payment account transmitted to a store terminal; encoding means for outputting output sound data of a PCM format obtained by encoding the data indicating the payment account; and sound output means for causing a DA converter to convert the output sound data so as to cause a speaker to output sound corresponding to the output sound data.

A program for store terminal according to the present invention causes a computer to function as: means for acquiring data indicating a payment account transmitted to a store terminal; encoding means for outputting output sound data of a PCM format obtained by encoding the data indicating the payment account; and sound output means for causing a DA converter to convert the output sound data so as to cause a speaker to output sound corresponding to the output sound data.

A payment system according to the present invention includes the mobile terminal and the store terminal.

A payment method according to the present invention includes: a step of acquiring data indicating a payment account transmitted to a store terminal; an encoding step of outputting output sound data of a PCM format obtained by encoding the data indicating the payment account; an output step of a mobile terminal causing a DA converter to convert the output sound data so as to cause a speaker to output sound corresponding to the output sound data; an input step of a store terminal acquiring, via an AD converter, input sound data of a PCM format indicating sound input to a microphone, the sound being obtained by encoding data indicating a payment account transmitted by a mobile terminal; a decoding step of decoding the data indicating the payment account based on the input sound data; a payment inquiring step of transmitting the data indicating the payment account and a payment amount to a balance management apparatus; and a result output step of outputting information indicating a result of payment based on information indicating propriety of payment received from the balance management apparatus.

According to the present invention, since the mobile terminal including the DA converter and the speaker and the store terminal including the AD converter and the microphone are used, it is possible to perform payment even if dedicated hardware for proximity communication such as a noncontact IC chip is not used.

In an aspect of the present invention, the encoding means may output the output sound data to suppress an amplitude change of the sound indicated by the output sound data.

In an aspect of the present invention, the mobile terminal may further include start control means for causing the speaker to output sound indicating a start of communication to the store terminal and for changing the magnitude of the sound that the sound output means causes the speaker to output based on sound input to a microphone, the sound being sound of the store terminal responding to the sound indicating the start of the communication.

In an aspect of the present invention, the mobile terminal may further include start control means for causing, using the sound output means, the speaker to output sound indicating a start of communication to the store terminal, and for, when sound of the store terminal responding to the sound indicating the start of the communication is not recognized, changing the magnitude of the sound that the sound output means causes the speaker to output and causing the speaker to output the sound indicating the start of the communication to the store terminal, repeatedly.

In an aspect of the present invention, the mobile terminal may further include payment information acquiring means for acquiring, based on a user ID, information indicating a payment account corresponding to the user ID via a network.

In an aspect of the present invention, the information indicating the payment account may include encrypted balance information of the payment account.

In an aspect of the present invention, the mobile terminal may further include payment result acquiring means for acquiring, after the speaker outputs sound corresponding to the information indicating the payment account, payment result information including updated and encrypted balance information of the payment account from the store terminal.

In an aspect of the present invention, the store terminal may further include start response means for causing, when sound input to the microphone, which is sound indicating a start of communication of the mobile terminal, satisfies a predetermined condition, a speaker to output sound indicating information for changing the magnitude of sound output by the mobile terminal.

In an aspect of the present invention, the result output means may output, when information indicating payment permission is received from the balance management apparatus, information for causing the speaker to output, as the information indicating the result of the payment, predetermined sound that the user can recognize.

In an aspect of the present invention, the data indicating the payment account may include encrypted balance information of the payment account, and the result output means may receive, when information indicating payment permission is received from the balance management apparatus, updated and encrypted balance information of the payment account from the balance management apparatus and transmit the received balance information to the mobile terminal.

In an aspect of the present invention, the store terminal may further include completion information transmitting means for transmitting information indicating payment completion to the balance management apparatus when information indicating that the balance information is received from the mobile terminal after the updated and encrypted balance information of the payment account is transmitted to the mobile terminal.

BRIEF DESCRIPTION OF THE DRAWINGS

FIG. 11 is a diagram showing an example of a processing flow of the store terminal.

FIG. 12 is a diagram showing an example of a processing flow of the payment server.

FIG. 13 is a diagram showing an example of information managed by the payment server.

DESCRIPTION OF EMBODIMENTS

Figure 1:
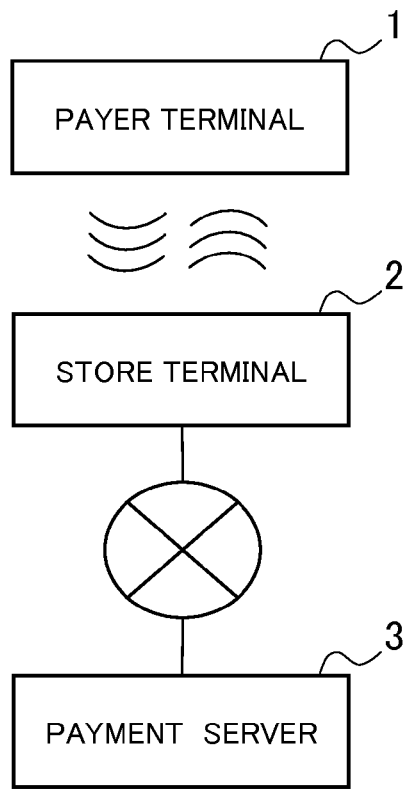
FIG. 1 is a diagram showing an example of the configuration of a payment system according to a first embodiment.

In the following explanation, a first embodiment and a second embodiment of the present invention are explained on the basis of the drawings. Among components denoted by the same reference characters, explanation of components, contents of which are the same as contents explained before the contents, is omitted.

First Embodiment

Figure 2:
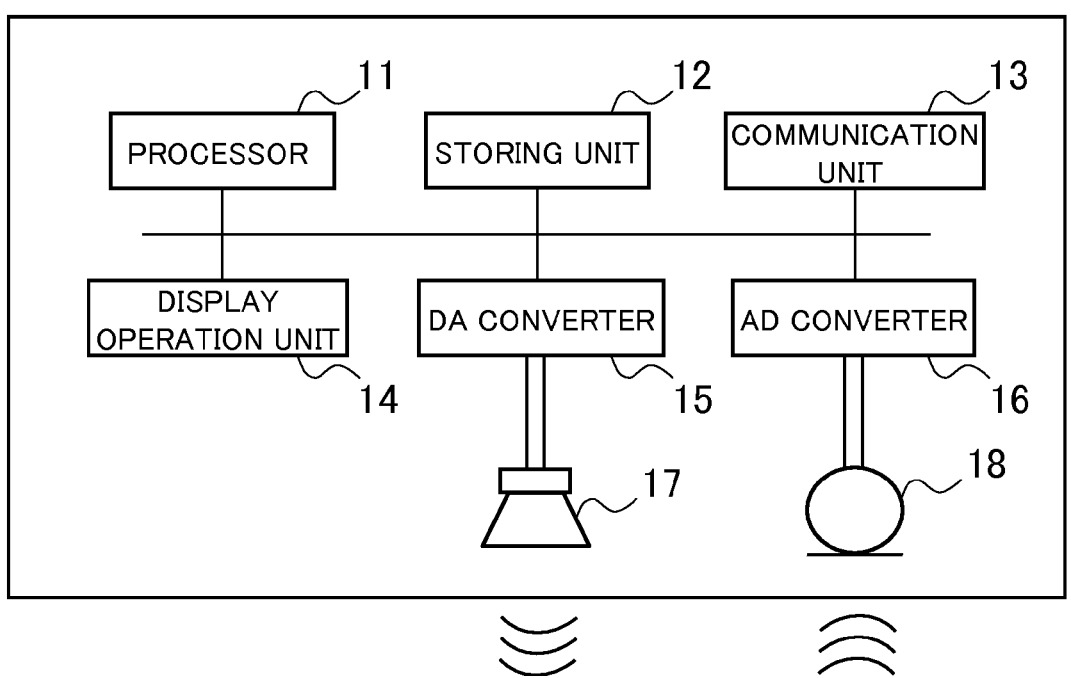
FIG. 2 is a diagram showing an example of the hardware configuration of a payer terminal and a store terminal according to the first embodiment.

FIG. 1 is a diagram showing an example of the configuration of a payment system according to a first embodiment. The payment system includes a payer terminal 1, a store terminal 2, and a payment server 3. The payer terminal 1 and the store terminal 2 are not physically connected. The store terminal 2 and the payment server 3 are connected via a communication line such as a leased line or a private network. The payment server 3 is the same irrespective of a store that owns a store terminal. The payment server 3 is set in, for example, a data center. The payment server 3 centrally owns and manages balance information of payment accounts and the like. FIG. 2 is a diagram showing an example of the hardware configuration of the payer terminal 1 and the store terminal 2 according to the first embodiment. Each of the payer terminal 1 and the store terminal 2 includes a processor 11, a storing unit 12, a communication unit 13, a display operation unit 14, a DA converter 15, an AD converter 16, a speaker 17, and a microphone 18. The payer terminal 1 may be, for example, a smart phone or a cellular phone owned by a user who makes a payment for commercial goods. The store terminal 2 is mainly a terminal for payment owned by a store. The store terminal 2 may be a POS register or a smart phone.

Although not shown in the figures, the payment server 3 includes the processor 11, the storing unit 12, and the communication unit 13. The payment server 3 may be, for example, a PC server.

The processor 11 operates according to a program stored in the storing unit 12. The processor 11 controls the communication unit 13, the display operation unit 14, the DA converter 15, and the AD converter 16. Note that the program may be provided via a network such as the Internet or may be provided while being stored in a computer-readable storage medium such as a flash memory.

The storing unit 12 is configured by a memory device such as a RAM or a flash memory, a hard disk drive, or the like. The storing unit 12 stores the program. The storing unit 12 stores information and calculation results input from the units.

The communication unit 13 communicates with another apparatus. The communication unit 13 is configured by an integrated circuit, an antenna, a communication terminal, and the like that configure a wired LAN or a wireless LAN. The communication unit 13 inputs information received from the other apparatus to a CPU 11 and the storing unit 12 and transmits information to the other apparatus on the basis of the control by the CPU 11. Note that the communication unit 13 may perform communication using a line of a cellular phone.

The display operation unit 14 is configured by means for controlling a display output device such as a liquid crystal display panel, means for controlling an input device such as a touch panel, and the like. The display operation unit 14 outputs image data and the like to the display output device and acquires information input by an operator (a user) from the input device on the basis of the control by the processor 11.

The DA converter 15 converts output sound data of a PCM format into an output signal voltage on the basis of the control by the processor 11. The DA converter 15 performs DA conversion using, for example, a $\Delta\Sigma$ method. The DA converter 15 also has a function of volume control for converting the output signal voltage according to setting by the operator.

The AD converter 16 converts an input signal voltage into input sound data of the PCM format on the basis of the control by the processor 11.

The speaker 17 outputs sound corresponding to the output signal voltage output by the DA converter 15. The speaker 17 is a speaker for sound output and mainly has a characteristic for outputting sound in an audible frequency band.

The microphone 18 converts input sound into an input signal voltage. The microphone 18 is a microphone for sound input and mainly has a characteristic of inputting sound in an audible frequency band.

Figure 3:
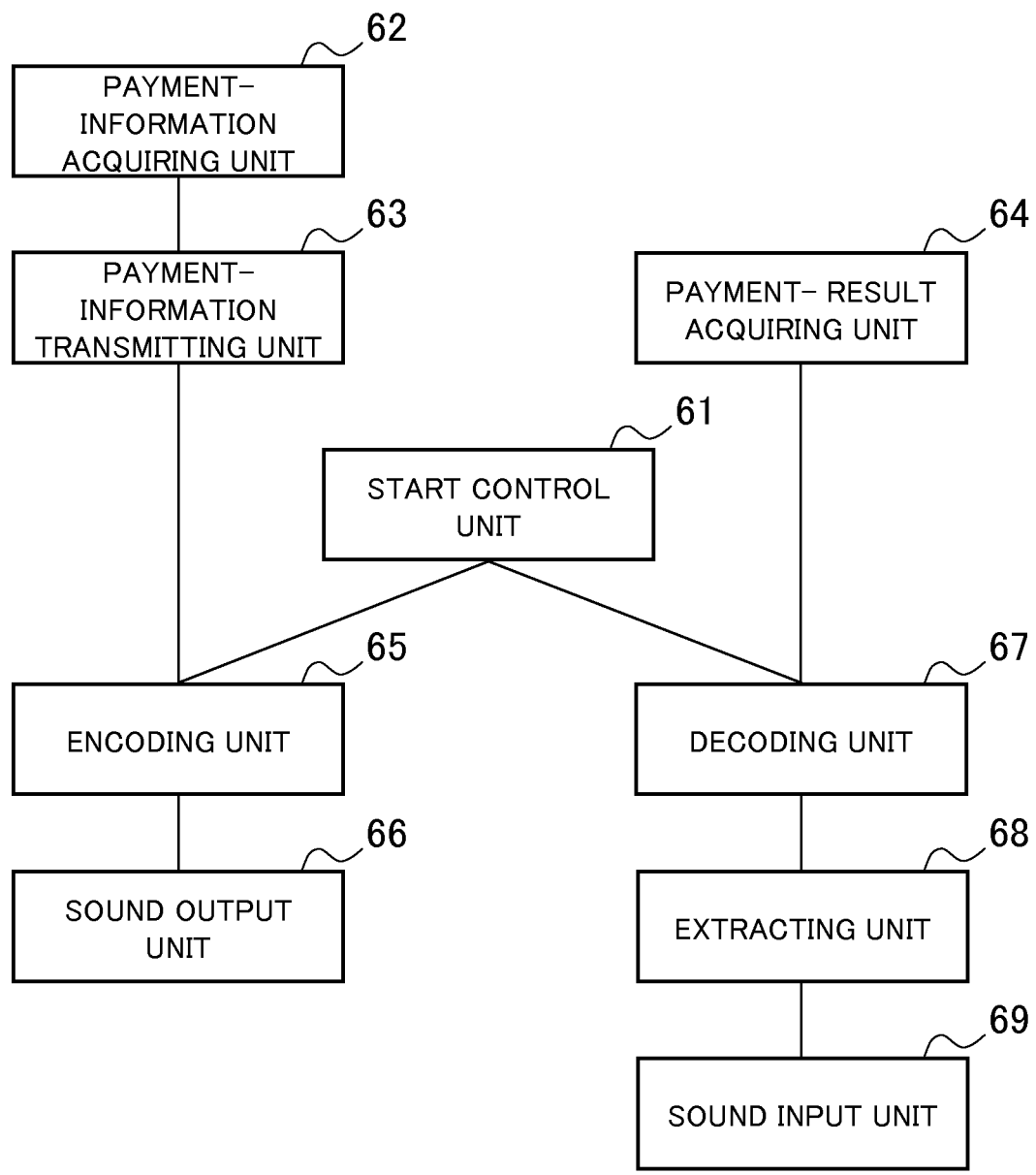
FIG. 3 is a functional block diagram showing functions realized by the payer terminal according to the first embodiment.

FIG. 3 is a functional block diagram showing functions realized by the payer terminal 1 according to the first embodiment. The payer terminal 1 functionally includes a start control unit 61, a payment-information acquiring unit 62, a payment-information transmitting unit 63, a payment-result acquiring unit 64, an encoding unit 65, a sound output unit 66, a decoding unit 67, an extracting unit 68, and a sound input unit 69. These functions are realized by the processor 11, which configures the payer terminal 1, executing the program stored in the storing unit 12 and controlling the DA converter 15, the AD converter 16, the communication unit 13, and the like.

Figure 4:
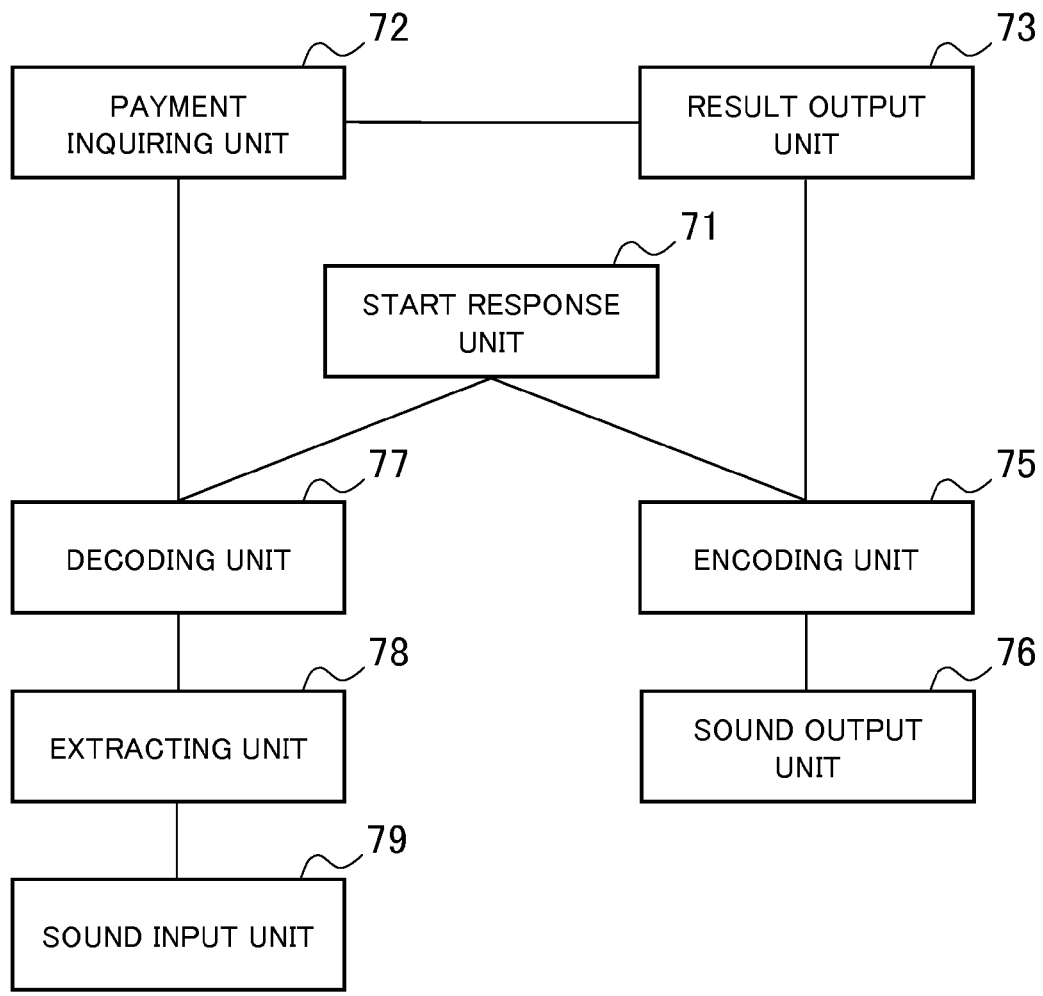
FIG. 4 is a functional block diagram showing functions realized by the store terminal according to the first embodiment.

FIG. 4 is a functional block diagram showing functions realized by the store terminal 2 according to the first embodiment. The store terminal 2 functionally includes a start response unit 71, a payment inquiring unit 72, a result output unit 73, an encoding unit 75, a sound output unit 76, a decoding unit 77, an extracting unit 78, and a sound input unit 79.

These functions are realized by the processor 11, which configures the store terminal 2, executing the program stored in the storing unit 12 and controlling the DA converter 15, the AD converter 16, the communication unit 13, and the like.

Figure 5:
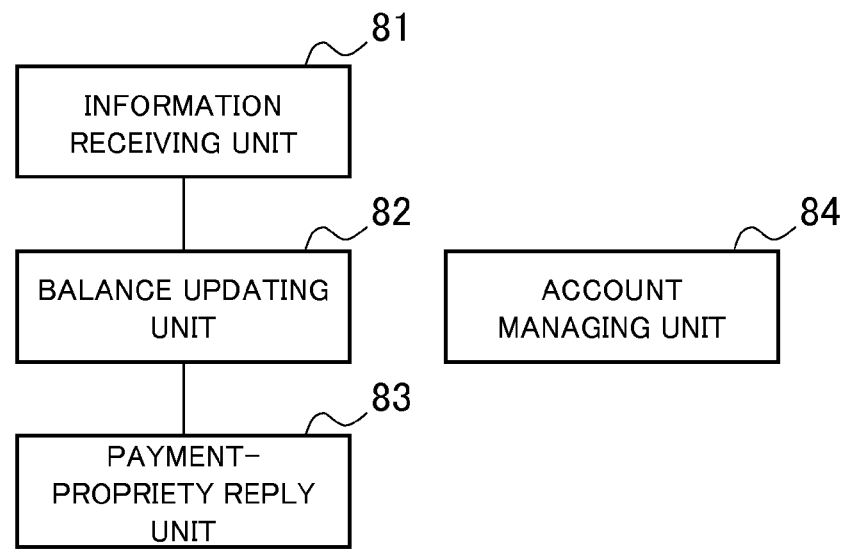
FIG. 5 is a functional block diagram showing functions realized by a payment server according to the first embodiment.

FIG. 5 is a functional block diagram showing functions realized by the payment server 3 according to the first embodiment. The payment server 3 functionally includes an information receiving unit 81, a balance updating unit 82, a payment-propriety reply unit 83, and an account managing unit 84. These functions are realized by the processor 11, which is included in the payment server 3, executing the program stored in the storing unit 12, exchanging data with the storing unit 12, and controlling the communication unit 13 and the like. The payment server 3 is an apparatus that manages a balance of a payment account for electronic money or the like.

Before payment is performed, a payer, who owns the payer terminal 1, shows a commercial item, which the payer desires to purchase, to a store clerk. The store clerk inputs information (a barcode, etc.) for identifying the commercial item to the store terminal 2. The store terminal 2 acquires an amount (a payment amount), which should be paid, from a commercial goods database or the like, stores the amount in the storing unit 12, and shows the amount to the payer via a screen. When the payment is performed, at least one piece of communication of data concerning the payment is performed between the payer terminal 1 and the store terminal 2 and between the store terminal 2 and the payment server 3. In particular, communication is mainly performed using sound in an inaudible frequency band between the payer terminal 1 and the store terminal 2. When data is transmitted from the payer terminal 1 to the store terminal 2, process explained below is roughly performed. First, the encoding unit 65 of the payer terminal 1 encodes the data to be transmitted and outputs output sound data of the PCM format including sound in the inaudible frequency band. The sound output unit 66 causes the DA converter 15 to convert the output sound data of the PCM format and causes the speaker 17 of the payer terminal 1 to output output sound indicating the data to be transmitted. The output sound is input to the microphone 18 of the store terminal 2. The sound input unit 79 of the store terminal 2 acquires input sound data of the PCM format indicating the sound via the AD converter 16. Further, the extracting unit 78 extracts the sound in the inaudible frequency band from the input sound data and decodes the transmission data on the basis of the extracted sound.

The encoding unit 75 and the sound output unit 76 of the store terminal 2 are respectively functions same as the encoding unit 65 and the sound output unit 66 of the payer terminal 1. The decoding unit 67, the extracting unit 68, and the sound input unit 69 of the payer terminal 1 are respectively functions same as the decoding unit 77, the extracting unit 78, and the sound input unit 79 of the store terminal 2.

Figure 6:
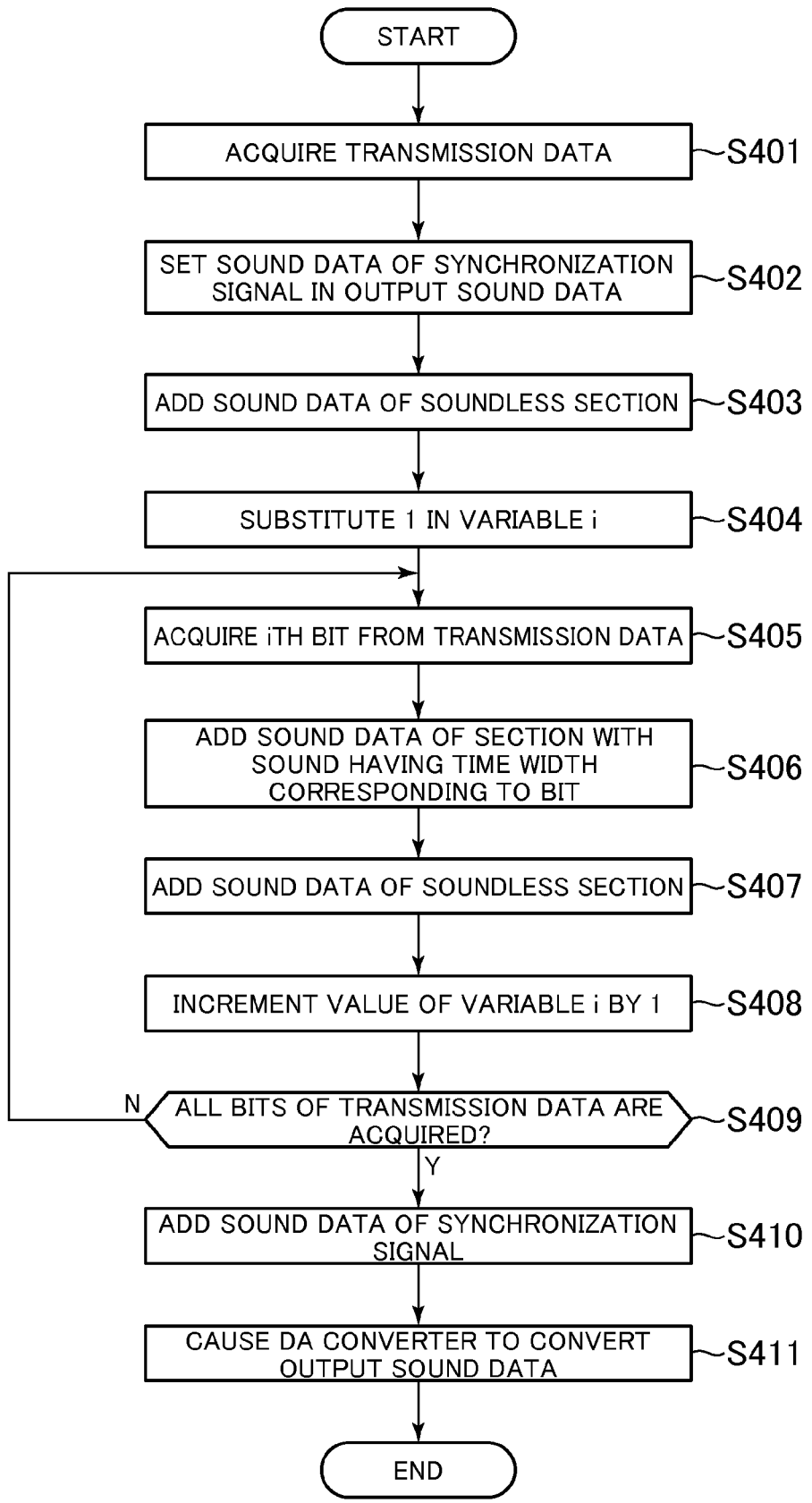
FIG. 6 is a diagram showing an example of a flow of transmitting process performed using sound.

In the following explanation, details of the functions of the encoding units 65 and 75, the sound output units 66 and 76, the decoding units 67 and 77, the extracting units 68 and 78, and the sound input units 69 and 79 are explained. For ease of explanation, process in the case of transmitting from the payer terminal 1 to the store terminal 2, that is, processing by the encoding unit 65, the sound output unit 66, the decoding unit 77, the extracting unit 78, and the sound input unit 79 is explained. FIG. 6 is a diagram showing an example of a flow of transmitting process performed using sound.

The encoding unit 65 is realized mainly by the processor 11 and the storing unit 12. The encoding unit 65 outputs output sound data of the PCM format obtained by encoding transmission data.

Figure 7:
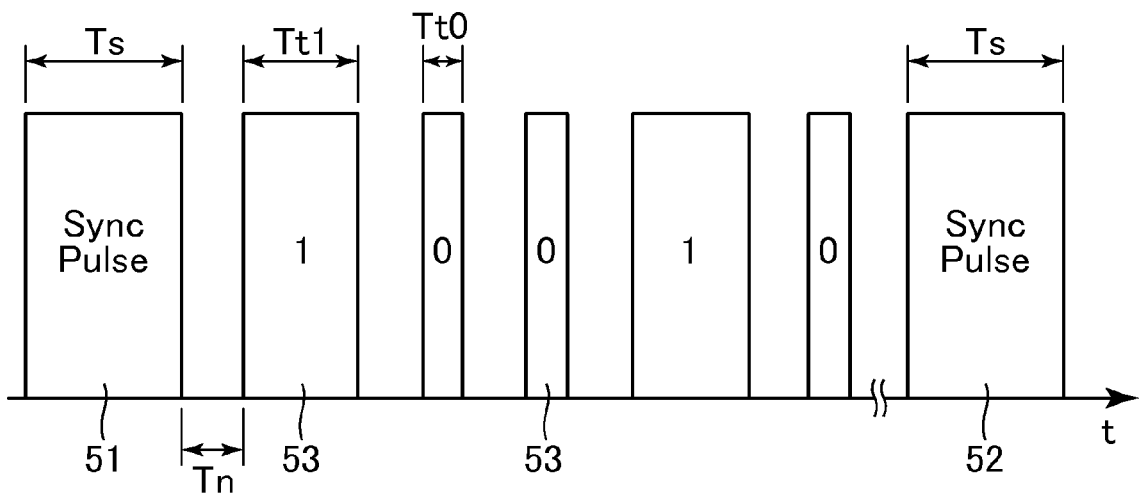
FIG. 7 is a diagram showing a transition of sound with time indicated by output sound data.

A format of the output sound data is explained. FIG. 7 is a diagram showing a transition of sound with time indicated by the output sound data. The sound indicated by the output sound data includes a synchronization signal 51 indicating an output start, a synchronization signal 52 indicating an output end, and a plurality of transmitted signal sections 53 sandwiched between the synchronization signal 51 and the synchronization signal 52 in terms of time. The plurality of transmitted signal sections 53 are signals obtained by modulating the transmission data. Each of the transmitted signal sections 53 is a section with sound where sound is output. The output sound is any one of two kinds of sound set in advance. Each of the transmitted signal section 53 corresponds to any one of bit arrays configuring the transmission data. The two kinds of sound output in the transmitted signal section 53 have time widths different from each other. Specifically, a time width Tt1 of the transmitted signal section 53 corresponding to a bit having a value 1 and a time width Tt0 of the transmitted signal section 53 corresponding to a bit having a value 0 are different. In an example shown in FIG. 7, the time width Tt1 is 6 ms and time width Tt0 is 2 ms. Soundless sections are arranged between the adjacent transmitted signal sections 53. Soundless sections are also arranged between the synchronization signals 51 and 52 and the transmitted signal sections 53 adjacent thereto. A time width Tn of the soundless sections is 10 ms. Note that, in this embodiment, if the time width Tt1 and the time width Tt0 are different, the time widths Tt0, Tt1, and Tn may be different from the above-mentioned time widths.

Details of processing by the encoding unit 65 are explained. First, the encoding unit 65 acquires transmission data passed to the encoding unit 65 (step S401). Subsequently, the encoding unit 65 sets sound data indicating the synchronization signal 51 in output sound data (step S402) and adds sound data indicating a soundless section (step S403). Subsequently, the encoding unit 65 substitutes 1 in a variable i (step S404) and performs process for adding the plurality of transmitted signal sections 53 to the output sound data.

The encoding unit 65 acquires an ith bit from the transmission data (step S405). It is assumed that the transmission data is a set of n bits arranged in order. Subsequently, the encoding unit 65 adds sound data indicating a section with sound having a time width corresponding to the acquired bit to the output sound data (step S406). Further, the encoding unit 65 adds sound data indicating a soundless section to the output sound data (step S407). The encoding unit 65 increments a value of the variable i by 1 (step S408). If the process is not performed concerning all the (n) bits configuring the transmission data (N in step S409), the encoding unit 65 repeats the process from step S405. If the process is performed concerning all the bits (Y in step S409), the encoding unit 65 adds sound data indicating the synchronization signal 52 to the output sound data (step S410). According to these kinds of process, the encoding unit 65 outputs the output sound data for outputting, in order, kinds of sound (sections with sound) corresponding to respective bits obtained when the transmission data is set as a binary bit string.

The sound output unit 66 is realized mainly by the processor 11 and the storing unit 12. The sound output unit 66 causes the DA converter 15 to convert output sound data so as to cause the speaker 17 to output sound indicated by the output sound data. Specifically, first, the sound output unit 66 outputs the output sound data to the DA converter 15 (step S411). The DA converter 15 converts the output sound data into an output signal voltage. The output signal voltage output from the DA converter 15 is input to the speaker 17. The speaker 17 outputs sound corresponding to the output signal voltage.

Figure 8:
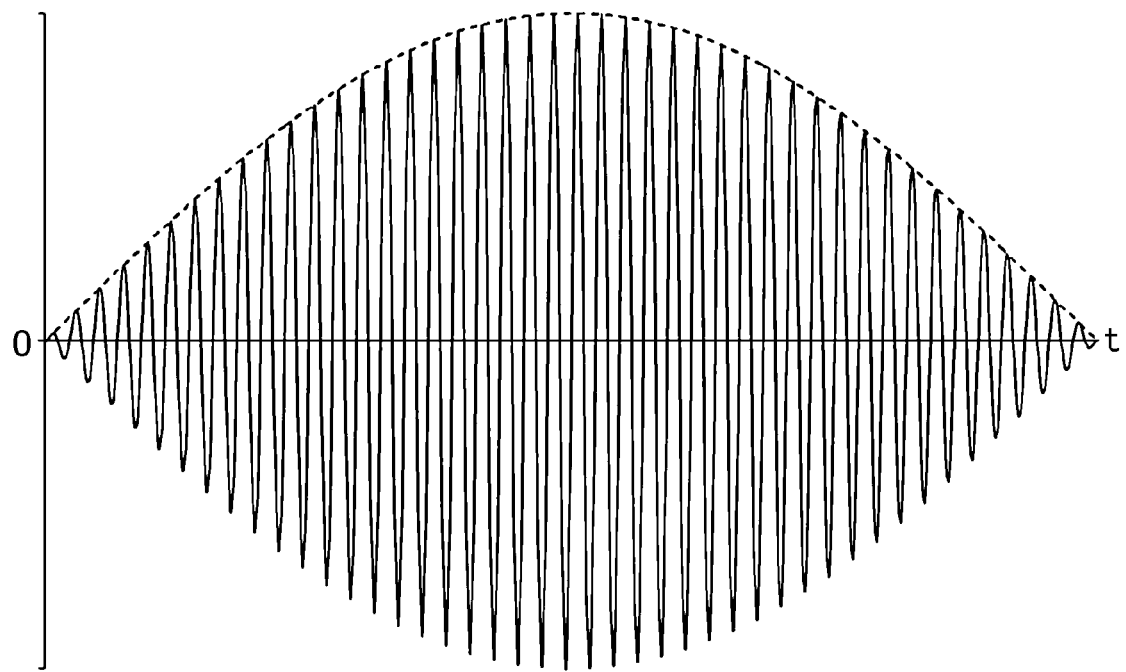
FIG. 8 is a diagram showing an example of a waveform in a section with sound.

Details of a signal in a section with sound are explained. FIG. 8 is a diagram showing an example of a waveform in the section with sound. A solid line indicates a waveform of sound in the section with sound. A broken line indicates a temporal variation of the amplitude of the waveform. In the section with sound, sound in an inaudible frequency band, specifically, at a frequency equal to or higher than 20 kHz and equal to or lower than a maximum frequency (about 25 kHz), which can be output, is output. Since the sound in the inaudible frequency band is used for communication, it is possible to prevent people around the payer terminal 1 from recognizing unpleasant noise. The encoding unit 65 sets the output sound data to suppress a change in the amplitude of the sound in the section with sound. More specifically, sections with sound indicated by the output sound data includes a section where the amplitude of the sound gradually increases and a section where the amplitude of the sound gradually decreases. The section where the amplitude of the sound gradually increases is a fixed section (in the example shown in FIG. 8, a former half portion) after a soundless section is switched to the section with sound. The section where the amplitude of the sound gradually decreases is a fixed section (in the example shown in FIG. 8, a latter half portion) before the section with sound is switched to a soundless section. In this embodiment, the amplitude of the section with sound having the above-described characteristic is calculated from a sine function of a cycle twice as large as a time width of the section with sound.

An expression indicating a waveform f(x) in a time step x in the section with sound is shown below. Output sound data of the PCM format is 16 bits and can take a value of −32768 to 32767. One time step is time obtained by dividing one second by a sampling rate.

$$f(x) = A\sin\left(\frac{2\pi}{B}x\right) \times \sin\left(\frac{2\pi}{\gamma}x\right)$$ [Math. 1]

$$A = \frac{2^{16}-1}{2},$$

$$B = \frac{samplingRate}{1000},$$

$$\gamma = \frac{samplingRate}{frequency}$$

In the expression, γ indicates a value obtained by dividing the sampling rate of the output sound data by the frequency of the sound in the inaudible frequency band. It is desirable to set the sampling rate to a value twice or more as large as and natural number times as large as the frequency of the inaudible frequency band used for communication. This is because it is possible to prevent a frequency lower than a target frequency from being output because of a difference between a sampling cycle and a cycle of sound. In this embodiment, the sampling rate is set to 44.1 kHz and the frequency of the sound is set to 22.05 kHz. A indicates a maximum value that can be taken as data in the section with sound. B indicates a value obtained by dividing the sampling rate with a frequency 1000 indicating an amplitude change. Note that, in actual output sound data, information of a decimal part of a value indicated by f(x) is rounded down.

The expression of f(x) is an expression obtained by multiplying a sine wave indicating the sound in the inaudible frequency band with a sine wave for suppressing the temporal variation of the amplitude. Consequently, the temporal variation of the amplitude is suppressed compared with a sine wave with fixed amplitude in a section with sound indicated by the following expression of fs(x).

$$fs(x) = A\sin\left(\frac{2\pi}{\gamma}x\right)$$ [Math. 2]

As explained above, the speaker 17 of the payer terminal 1 (and the store terminal 2) is the speaker for sound. Therefore, when sound in the inaudible frequency band equal to or higher than 20 kHz is output, a phenomenon sometimes occurs in which the speaker 17 cannot follow a change in an output signal voltage because of physical properties. When the phenomenon occurs, sound like noise at a lower frequency is output from the speaker 17. The phenomenon substantially definitely occurs when the sound in the section with sound indicated by fs(x) is output. However, when the temporal variation of the amplitude is limited as in f(x), since the speaker 17 easily follows the temporal variation of the output signal voltage, the phenomenon does not occur. Consequently, it is possible to greatly reduce noise caused by the speaker 17 during communication, which is noise that the user can recognize.

Note that one transmitted signal section 53 in the output sound data output by the encoding unit 65 does not always have to represent 1-bit data. For example, kinds of a time width of the one transmitted signal section 53 may be set to four kinds. The one transmitted signal section 53 may be associated with 2 bits of transmission data. The transmission data may be converted into an array of values in base-k positional notation (k>3). The encoding unit 65 may output the output sound data to output kinds of sound respectively corresponding to the values among k kinds of sound.

Figure 9:
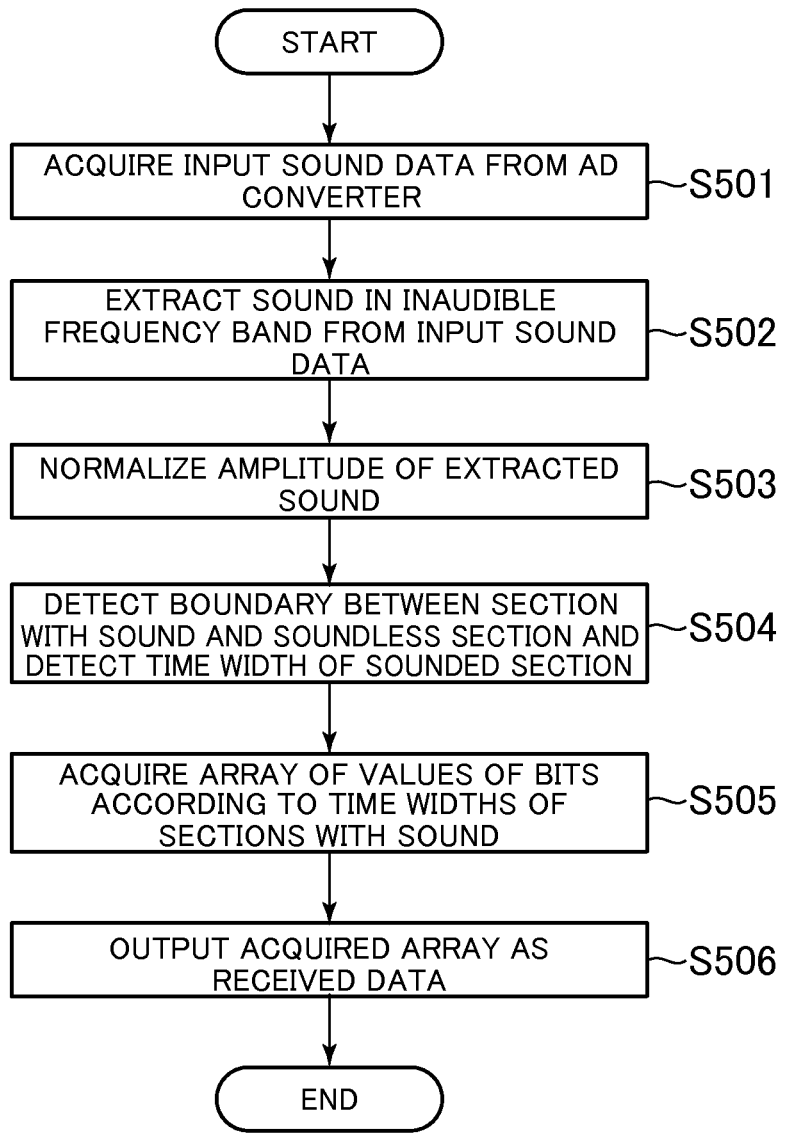
FIG. 9 is a diagram showing an example of a flow of receiving process performed using sound.

FIG. 9 is a diagram showing an example of a flow of receiving process performed using sound. In the following explanation, functions of the decoding unit 77, the extracting unit 78, and the sound input unit 79 are explained according to the processing flow.

The sound input unit 79 is realized mainly by the processor 11 and the storing unit 12. The sound input unit 79 acquires input sound data of the PCM format obtained by converting sound input to the microphone 18 from the AD converter 16 (step S501). This process is performed in a state in which sound output by a transmitting source (the speaker 17 of the payer terminal 1) is input to the microphone 18. Then, data of sound obtained by encoding transmission data is included in the input sound data. Note that, in this embodiment, a sampling rate is set to a sampling rate same as a sampling rate of the transmitting source (the payer terminal 1).

The extracting unit 78 is realized mainly by the processor 11 and the storing unit 12. The extracting unit 78 extracts sound in the inaudible frequency band from the input sound data acquired by the sound input unit 79 (step S502) and stores data indicating the extracted sound in the storing unit 12. The extracting unit 78 uses a bandpass filter in order to extract the sound in the inaudible frequency band. By performing this process, it is possible to remove the influence of noise such as voices of people around the store terminal 2. If a precondition is that communication is performed in an environment with little noise, the extracting unit 78 may directly pass the input sound data to the decoding unit 77 without performing this process.

The decoding unit 77 is realized mainly by the processor 11 and the storing unit 12. The decoding unit 77 decodes transmission data on the basis of the data indicating the extracted sound. First, the decoding unit 77 normalizes the amplitude of the extracted sound (step S503). Consequently, even if the magnitude of sound input to the microphone 18 is different every time communication is performed, a problem does not occur in the following process. Note that, when the magnitude of the sound is outside a predetermined range (larger than a maximum value or smaller than a minimum value) in the normalization, the decoding unit 77 notifies a function at a destination, to which data decoded by the decoding unit 67 is passed, of information (error information) indicating that the magnitude of the sound is outside the predetermined range.

Subsequently, the decoding unit 77 detects a boundary between a section with sound and a soundless section and detects a time width of each of a plurality of sections with sound (step S504). The decoding unit 77 acquires an array of values of bits according to detected time widths of the periods with sound (step S505) and outputs the acquired array of values to the storing unit 12 or the like as decoded received data (step S506). The decoding unit 77 may improve accuracy of the received data using a publicly-known error correction technique such as CRC correction. If there are three or more kinds of the time width of the transmitted signal section 53 output by the transmitting source (the payer terminal 1), the decoding unit 77 may acquire an array of values corresponding to the types of the time width and decode the received data.

The apparatus on the transmitter side including the speaker 17 connected to the DA converter 15 and the apparatus on the receiver side including the microphone 18 connected to the AD converter 16 can perform communication using the above-mentioned technique without adding other devices. The sound in the inaudible frequency band has strong directivity compared with a radio wave. Therefore, it is less likely that another apparatus receives transmitted content by mistake. It is unnecessary to add a function of preventing interference or complicate operation unlike the case when the radio wave is used. Moreover, since the sound in the inaudible frequency band is used and occurrence of noise is suppressed, although communication is performed by using the speaker, a person does not recognize unpleasant sound through the communication. Therefore, there is little influence on a human body.

In the above explanation, the transmission data is encoded using the time width of the sound output by the speaker 17. However, the transmission data may be encoded using other modulation methods. For example, bits of a bit array to be transmitted may be represented by a difference in the amplitude of sound as in an AM modulation system. Bits of a bit array may be represented by a difference in the frequency of sound as in an FM modulation system. However, the decoding the transmission data using the time width of sound is resistant to an environment change such as noise compared with the former and is small in computational complexity compared with the latter.

Note that, when the store terminal 2 transmits data to and receives data from the payer terminal 1, the encoding unit 75 and the sound output unit 76 of the store terminal 2 respectively perform kinds of processing same as the kinds of processing by the encoding unit 65 and the sound output unit 66 of the payer terminal 1. The decoding unit 67, the extracting unit 68, and the sound input unit 69 of the payer terminal 1 respectively perform kinds of processing same as the kinds of processing by the decoding unit 77, the extracting unit 78, and the sound input unit 79 of the store terminal 2.

Figure 10:
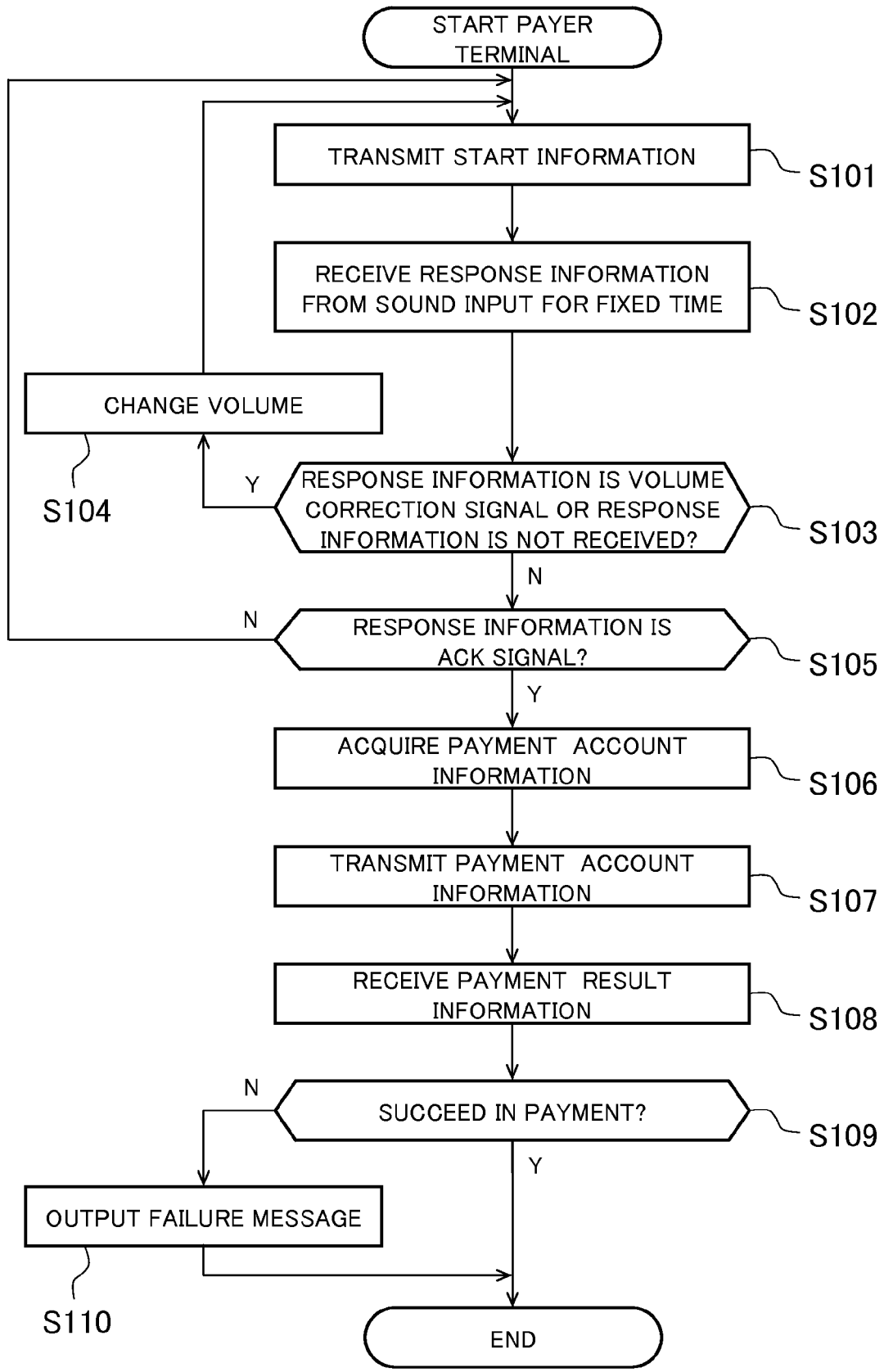
FIG. 10 is a diagram showing an example of a processing flow of the payer terminal.

Process of payment performed using the communication by the sound in the audible frequency band and a function of performing the process are explained according to the order of the process. FIG. 10 is a diagram showing an example of a processing flow of the payer terminal 1. FIG. 11 is a diagram showing an example of a processing flow of the store terminal 2. FIG. 12 is a diagram showing an example of a processing flow of the payment server 3.

The start control unit 61 of the payer terminal 1 is realized mainly by the processor 11 and the storing unit 12. The start control unit 61 causes the speaker 17 to output sound indicating start information to the store terminal 2 so as to transmit the start information (step S101). The start information is information for informing the store terminal 2 of the start of communication. More specifically, the start control unit 61 causes the encoding unit 65 to encode the start information as transmission data and causes the DA converter 15 to convert output sound data output by the encoding unit 65 via the sound output unit 66 so as to cause the speaker 17 to output sound indicating the start information.

The start response unit 71 of the store terminal 2 is realized mainly by the processor 11 and the storing unit 12. The start response unit 71 acquires, from sound input to the microphone 18, the start information output by the payer terminal 1 and causes the speaker 17 of the store terminal 2 to output sound indicating an ACK signal responding to the start information. When the magnitude of the sound indicating the start information input to the microphone 18 is not within a predetermined range, the start response unit 71 causes the speaker to output sound indicating information for changing the volume of the sound output by the speaker 17 of the payer terminal 1 such that the magnitude of the sound falls within the predetermined range. More specifically, first, the sound input unit 79 acquires, on the basis of an instruction of the start response unit 71, input sound data of the PCM format obtained by converting the sound input to the microphone 18 (step S201). Subsequently, the start response unit 71 acquires decoded information or error information as a result of processing performed by the extracting unit 78 and the decoding unit 77 on the basis of the input sound data. When the error information does not indicate that the magnitude of the acquired sound is within the predetermined range, for example, indicates that the acquired sound is too weak to be decoded (N in step S202), the start response unit 71 causes, using the encoding unit 75 and the sound output unit 76 of the store terminal 2, the speaker 17 to output sound indicating volume correction signal for changing (in the case explained above, increasing), with the sound output unit 66 of the payer terminal 1, the volume of the sound output by the speaker 17 such that the magnitude of the acquired sound falls within the predetermined range (step S203). The start response unit 71 repeats the process from step S201 to acquire data of sound, which is a response to the output sound. When the error information indicates that the magnitude of the acquired sound is within the predetermined range (Y in step S202), the start response unit 71 determines whether information decoded from the acquired sound is the start information (step S204). When the information is not the start information (N in step S204), the start response unit 71 repeats the acquisition of data of the sound from step S201. When the information is the start information (Y in step S204), the start response unit 71 causes, using the encoding unit 75 and the sound output unit 76 of the store terminal 2, the speaker 17 to output sound indicating the ACK signal responding to the start information (step S205).

The sound input unit 69, the extracting unit 68, and the decoding unit 67 of the payer terminal 1 perform the above-mentioned receiving process concerning sound input from the microphone 18 during a fixed time. If there is received data, the sound input unit 69, the extracting unit 68, and the decoding unit 67 receive the received data as response information decoded from sound returned by the store terminal 2 (step S102). Subsequently, when the response information is a volume correction signal or the response information is not received (Y in step S103), the start control unit 61 changes the volume of the sound output unit 66 such that the sound output unit 66 causes the speaker 17 to output sound at magnitude indicated by the volume correction signal or, when the volume correction signal is not received, increases the magnitude (step S104). The start control unit 61 repeats the process from the transmitting start information in step S101 again. When the response information is received and the response information is neither the volume correction signal nor the ACK signal (N in step S105), the start control unit 61 repeats the process from step S101. When the response information is the ACK signal (Y in step S105), processing by the payment-information transmitting unit 63 is performed.

According to the processing by the start control unit 61 and the start response unit 71 explained above, it is possible to appropriately adjust the volume of the sound necessary for communication. Consequently, it is possible to optimally adjust a balance between security and a communication error.

The payment-information transmitting unit 63 of the payer terminal 1 is realized mainly by the processor 11 and the storing unit 12. The payment-information transmitting unit 63 acquires payment account information, which is data indicating a payment account, stored in the storing unit 12 in advance (step S106). The payment-information transmitting unit 63 inputs the payment account information to the encoding unit 65 and the sound output unit 66 as transmission data. Thus the payment-information transmitting unit 63 transmits the payment account information via sound of the speaker 17 (step S107). In this example, the payment account information is an account number.

The payment account information is information acquired by the payment-information acquiring unit 62 in advance and stored in the storing unit 12. The payment-information acquiring unit 62 is realized mainly by the processor 11, the storing unit 12, and the communication unit 13. The payment-information acquiring unit 62 transmits authentication information such as a user ID and a password to the payment server 3 via a network using the communication unit 13 and acquires account information corresponding to the user ID from the payment server 3.

The account managing unit 84 of the payment server 3 is realized mainly by the processor 11, the storing unit 12, and the communication unit 13. The account managing unit 84 manages account information and balance information. FIG. 13 is a diagram showing an example of information managed by the payment server 3. The information shown in FIG. 13 is stored in the storing unit 12. In FIG. 13, a column of "User ID" indicates the user ID, a column of "PW" indicates the password, a column of "Account Number" indicates the account information, and a column of "Balance" indicates the balance of the user, which is balance information. These kinds of information are stored in a not-shown key value store.

The user ID and the password are information set when the user owning the payer terminal 1 is registered beforehand. The account managing unit 84 receives an input of personal information from the user via the payer terminal 1, a PC, or the like, determines the user ID and the password between the account managing unit 84 and the user, and stores the user ID and the password in the storing unit 12. The account managing unit 84 generates an account number and stores the account number in the storing unit 12. Further, the account managing unit 84 transmits the account information corresponding to the user ID to the payment-information acquiring unit 62 of the payer terminal 1. When the authentication information such as the user ID and the password are received from the payment-information acquiring unit 62 of the payer terminal 1, the account managing unit 84 performs authentication concerning the user ID using the authentication information. If the authentication is successful, the account managing unit 84 transmits the account information to the payment-information acquiring unit 62. Consequently, if the user ID and the password are stored, even if the user changes the payer terminal 1 to another one, the user can perform payment using the new payer terminal 1. Naturally, it is also possible to ensure security by not showing the account information even to the user. Note that the account managing unit 84 may manage a use history such as a deposit and withdrawal history. The account managing unit 84 may provide a screen on which the payer makes payment from a credit card or the like using the payer terminal 1. When a balance is lower than a predetermined amount, the payer terminal 1 side may automatically access the account managing unit 84 and deposit the predetermined amount.

Processing by the store terminal 2 after transmitting the payment account information by the payer terminal 1 and the subsequent process are explained. First, the sound input unit 79, the extracting unit 78, and the decoding unit 77 of the store terminal 2 perform the above-mentioned receiving process concerning the sound input from the microphone 18 and receive received data of the sound as the payment account information (step S206).

The payment inquiring unit 72 of the store terminal 2 is realized mainly by the processor 11, the storing unit 12, and the communication unit 13. The payment inquiring unit 72 transmits the payment account information, which is the data indicating the payment account, and the payment amount to the payment server 3 (step S207).

The information receiving unit 81 of the payment server 3 is realized mainly by the processor 11, the storing unit 12, and the communication unit 13. The information receiving unit 81 receives the payment account information and the payment amount from the store terminal 2 (step S301).

The balance updating unit 82 of the payment server 3 is realized mainly by the processor 11 and the storing unit 12. The balance updating unit 82 acquires a balance of an account indicated by the received payment account information (step S302). If the balance is not equal to or larger than the payment amount (N in step S303), the balance updating unit 82 transmits payment result information indicating payment non-permission to the store terminal 2 (step S304). If the balance is equal to or larger than the payment amount (Y in step S303), the balance updating unit 82 updates the balance by subtracting the payment amount from the balance (step S305) and transmits payment result information indicating payment permission to the store terminal 2 (step S306). In the example shown in FIG. 12, the process concerning the payment of the payment server 3 ends.

The result output unit 73 of the store terminal 2 is realized mainly by the processor 11 and the storing unit 12. The result output unit 73 receives the payment result information indicating propriety of payment from the payment server (step S208). The result output unit 73 outputs information indicating a result of the payment on the basis of the payment result information. More specifically, the result output unit 73 transmits the payment result information to the payer terminal 1 as transmission data using the encoding unit 75 and the sound output unit 76 (step S209). When payment result information indicates payment permission (Y in step S210), the result output unit 73 passes data of success sound to the sound output unit 76 and causes the speaker 17 of the store terminal 2 to output the success sound (step S211). When the payment result information indicates payment non-permission (Y in step S210), the result output unit 73 passes data of failure sound to the sound output unit 76 and causes the speaker 17 of the store terminal 2 to output the failure sound (step S212). Note that the result output unit 73 does not have to transmit the payment result information to the payer terminal 1.

The payment-result acquiring unit 64 of the payer terminal 1 is realized mainly by the processor 11, the storing unit 12, and the display operation unit 14. The payment-result acquiring unit 64 receives the payment result information using the sound input unit 69, the extracting unit 68, and the decoding unit 67 (step S108). When the payment result information indicates payment non-permission (N in step S109), the payment-result acquiring unit 64 outputs a failure message via the display operation unit 14 (step S110).

According to the payment method explained above, simply by installing an application program in a smart phone, a cellular phone, or the like, it is possible to use even the smart phone or the cellular phone not mounted with a noncontact IC chip as the payer terminal 1. This is because the smart phone or the cellular phone is always equipped with the DA converter 15 and the speaker 17 connected to the DA converter 15 and the AD converter 16 and the microphone 18 connected to the AD converter 16. The application program may be delivered by a server prepared by a payment company or may be delivered by a delivery system provided by a company that provides the smart phone or an OS, or a carrier of the cellular phone.

Second Embodiment

A second embodiment is different from the first embodiment in that balance information is stored in the payer terminal 1. In this embodiment, the balance information does not always have to be centrally managed by the payment server 3. In the following explanation, concerning the second embodiment, differences from the first embodiment are mainly explained.

Figure 14:
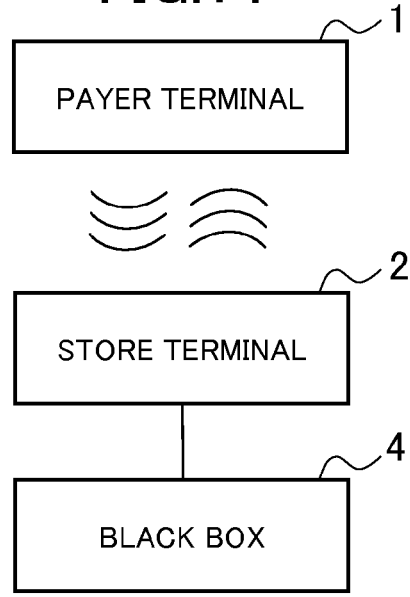
FIG. 14 is a diagram showing an example of the configuration of a payment system according to a second embodiment.

FIG. 14 is a diagram showing an example of the configuration of a payment system according to the second embodiment. The payment system includes the payer terminal 1, the store terminal 2, and a black box 4. The second embodiment is the same as the first embodiment in that the payer terminal 1 and the store terminal 2 are not physically connected. However, the second embodiment is different from the first embodiment mainly in that the black box 4 is present in each of stores, does not own balance information itself of a payment account, and does not centrally manage balance information. The hardware configuration of the payer terminal 1 and the store terminal 2 is the same as the hardware configuration explained with reference to FIG. 2 in the first embodiment. Therefore, explanation of the hardware configuration is omitted. Although not shown in the figure, the black box 4 includes the processor 11, the storing unit 12, and the communication unit 13. The processor 11 and the storing unit 12 included in the black box 4 has a function of limiting readout of data from the outside in order to prevent reverse engineering and a leak of an encryption key.

Figure 15:
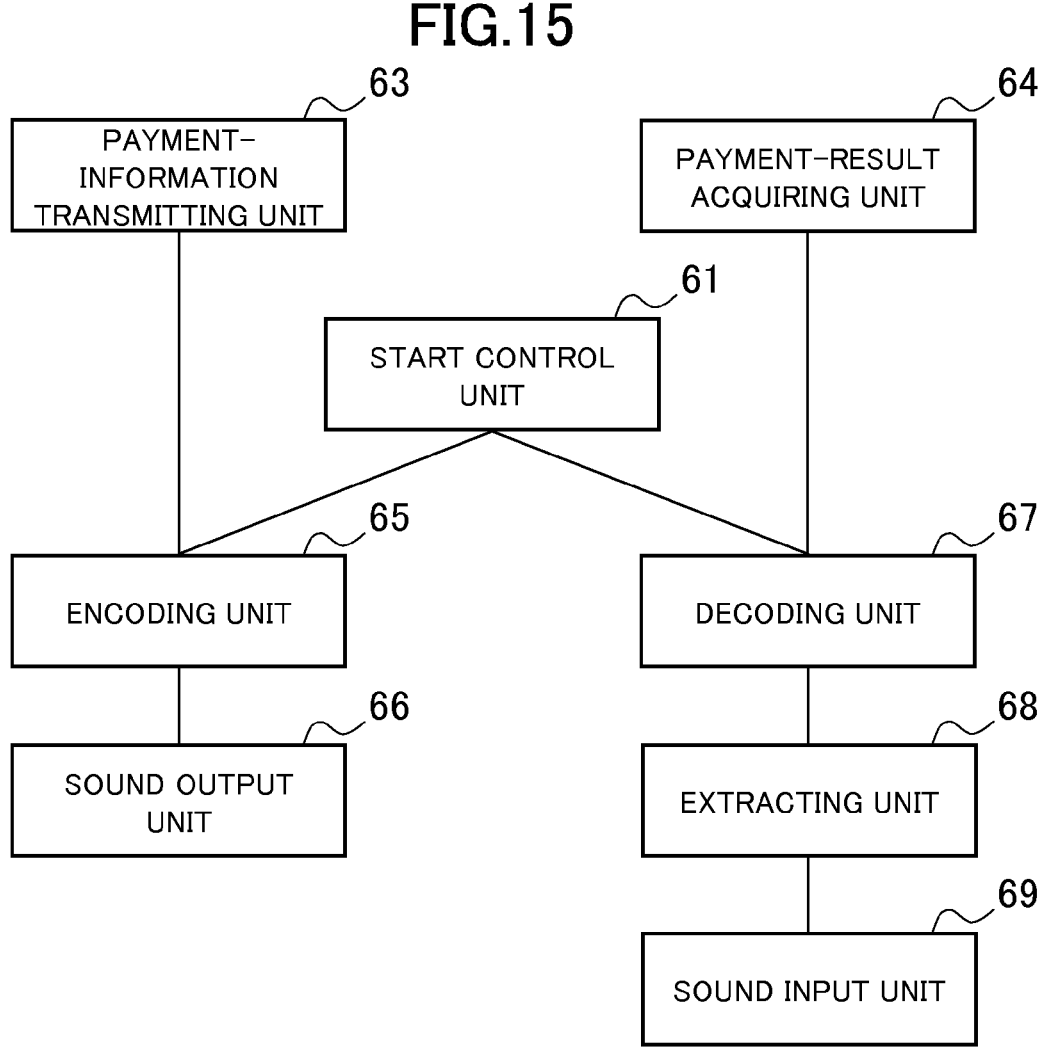
FIG. 15 is a functional block diagram showing functions realized by a payer terminal according to the second embodiment.

FIG. 15 is a functional block diagram showing functions realized by the payer terminal 1 according to the second embodiment. The payer terminal 1 functionally includes the start control unit 61, the payment-information transmitting unit 63, the payment-result acquiring unit 64, the encoding unit 65, the sound output unit 66, the decoding unit 67, the extracting unit 68, and the sound input unit 69. These functions are realized by the processor 11, which configures the payer terminal 1, executing the program stored in the storing unit 12 and controlling the DA converter 15, the AD converter 16, the communication unit 13, and the like.

Figure 16:
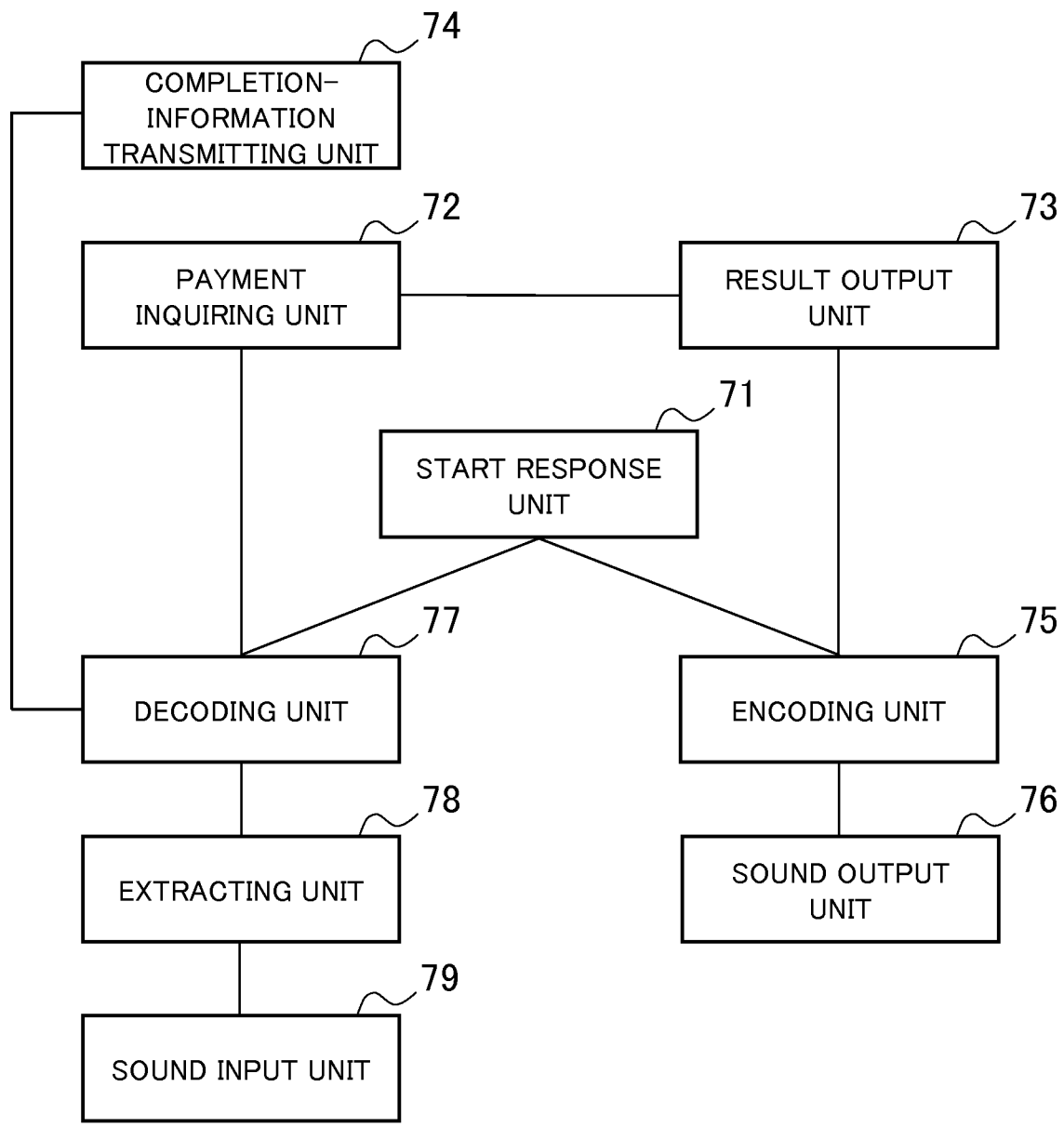
FIG. 16 is a functional block diagram showing functions realized by a store terminal according to the second embodiment.

FIG. 16 is a functional block diagram showing functions realized by the store terminal 2 according to the second embodiment. The store terminal 2 functionally includes the start response unit 71, the payment inquiring unit 72, the result output unit 73, a completion-information transmitting unit 74, the encoding unit 75, the sound output unit 76, the decoding unit 77, the extracting unit 78, and the sound input unit 79. These functions are realized by the processor 11, which configures the store terminal 2, executing the program stored in the storing unit 12 and controlling the DA converter 15, the AD converter 16, the communication unit 13, and the like.

Figure 17:
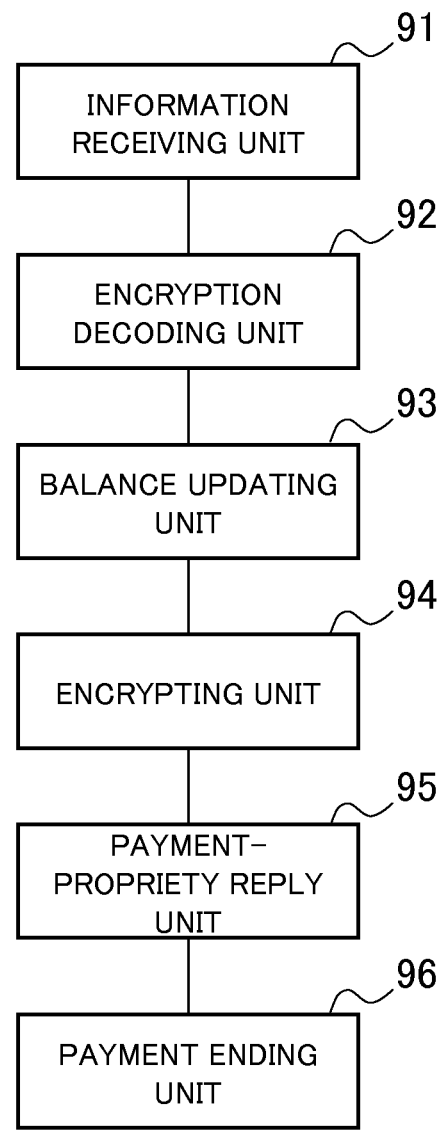
FIG. 17 is a functional block diagram showing functions realized by a black box according to the second embodiment.

FIG. 17 is a functional block diagram showing functions realized by the black box 4 according to the second embodiment. The black box 4 functionally includes an information receiving unit 91, an encryption decoding unit 92, a balance updating unit 93, an encrypting unit 94, a payment-propriety reply unit 95, and a payment ending unit 96. These functions are realized by the processor 11, which is included in the black box 4, executing the program stored in the storing unit 12 and controlling the communication unit 13 and the like. The black box 4 is an apparatus that changes (manages) a balance of a payment account of electronic money or the like received from the payer terminal 1. Note that, even if a plurality of the store terminals 2 are set in a certain store, only one black box 4 may be stored in the store. This is because, if the store terminals 2 and the black box 4 are connected via a network, it is unnecessary to provide the black box 4 for each of the store terminals 2. If the black box 4 has a general communication function, it is easy to connect the store terminal 2 to the black box 4. For example, even when the store terminal 2 is an apparatus for which extension is difficult such as a smart phone, it is possible to easily use a security function of the black box 4.

Figure 18:
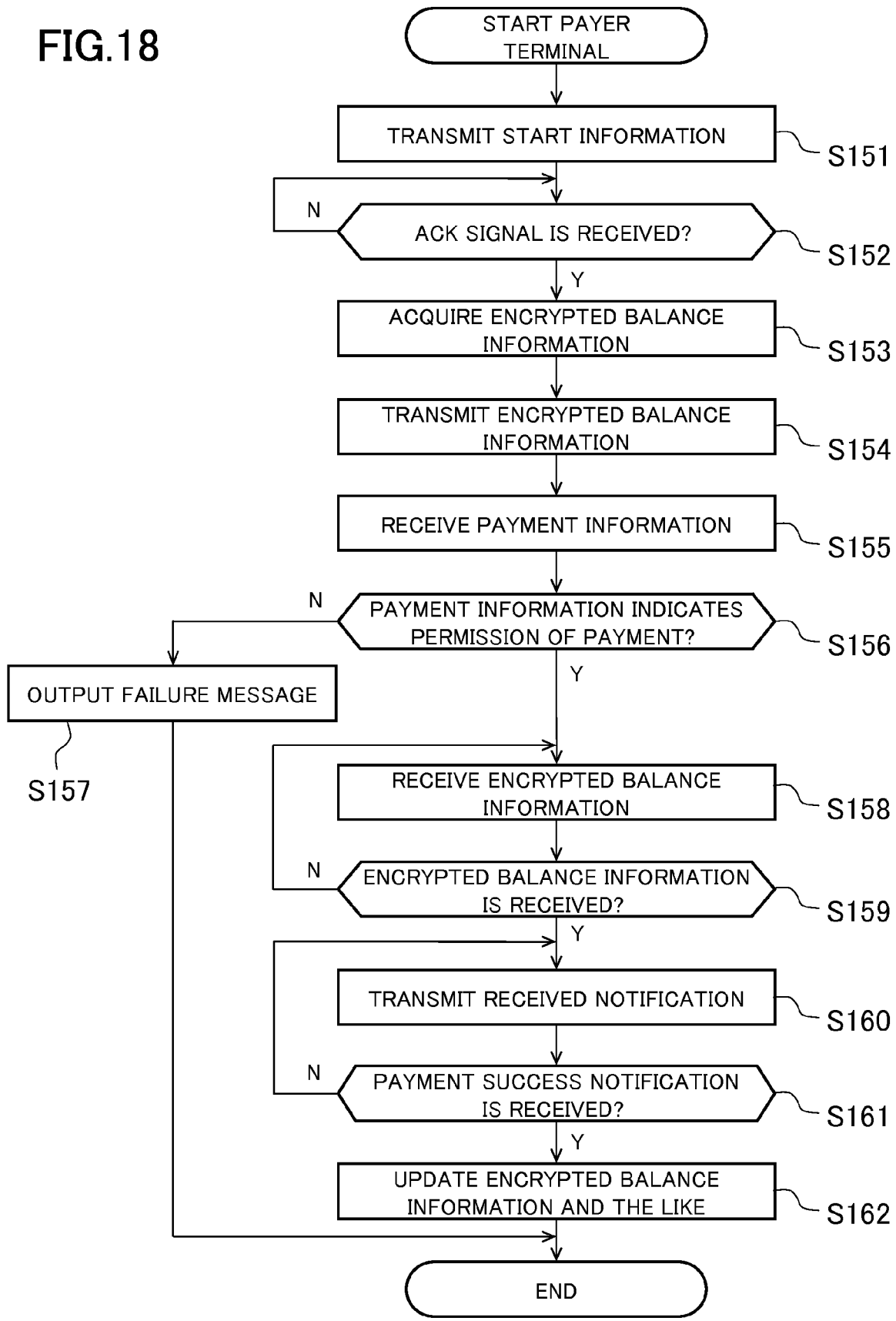
FIG. 18 is a diagram showing an example of a processing flow of the payer terminal.
Figure 19:
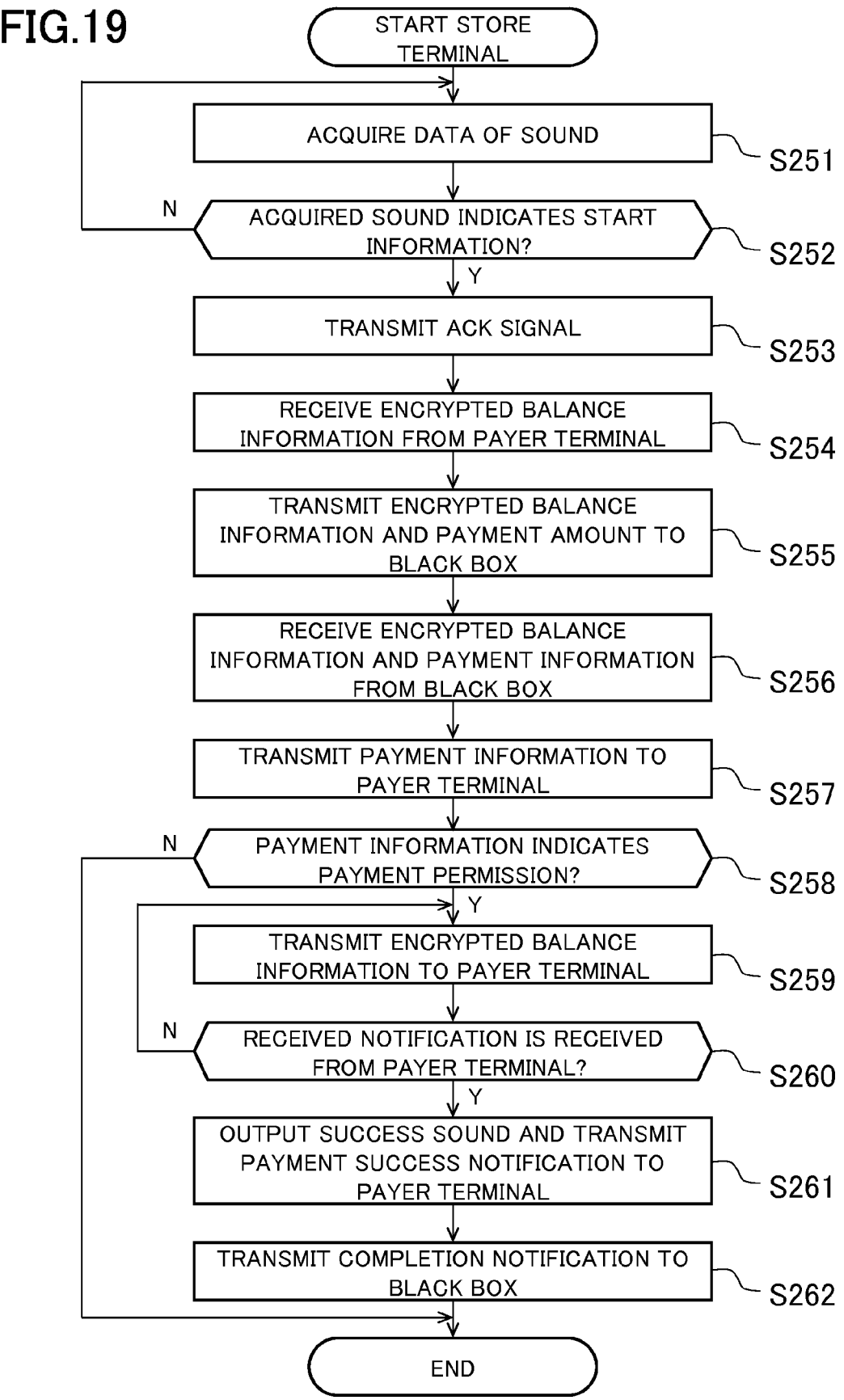
FIG. 19 is a diagram showing an example of a processing flow of the store terminal.
Figure 20:
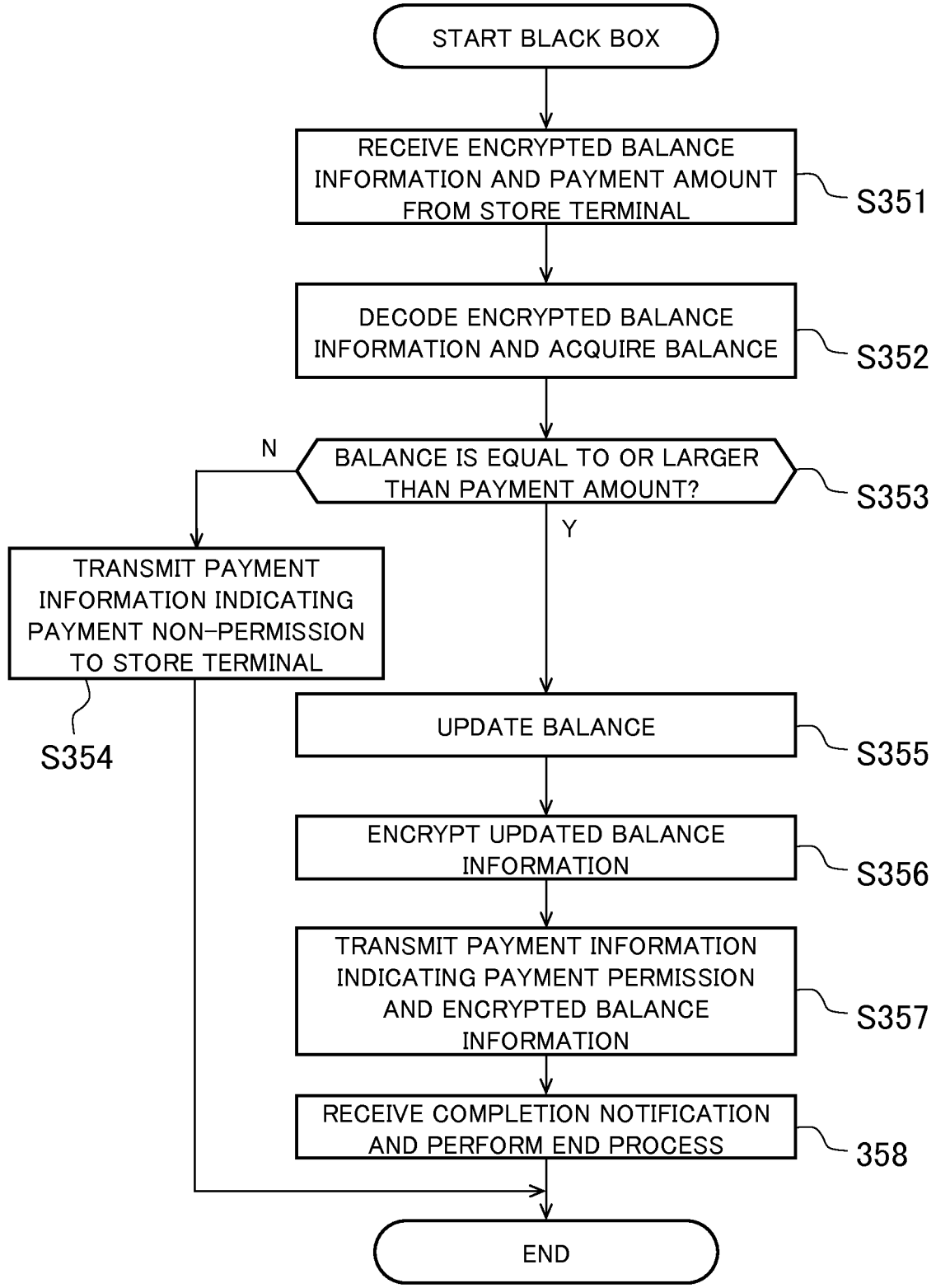
FIG. 20 is a diagram showing an example of a processing flow of the black box.

The encoding units 65 and 75, the sound output units 66 and 76, the decoding units 67 and 77, the extracting units 68 and 78, and the sound input units 69 and 79 according to the second embodiment have functions same as the functions in the first embodiment. Therefore, explanation of the functions is omitted. In the following explanation, process of payment and a function of performing the payment are explained according to processing flows. FIG. 18 is an example of a processing flow of the payer terminal 1. FIG. 19 is a diagram showing an example of a processing flow of the store terminal 2. FIG. 20 is a diagram showing an example of a processing flow of the black box 4.

The start control unit 61 of the payer terminal 1 is realized mainly by the processor 11 and the storing unit 12. The start control unit 61 causes the speaker 17 to output sound indicating start information to the store terminal 2 so as to transmit the start information (step S151). More specifically, the start control unit 61 causes the encoding unit 65 to encode the start information as transmission data, causes, via the sound output unit 66, the DA converter 15 to convert encoded output sound data, and causes the speaker 17 to output sound including the start information.

The start response unit 71 of the store terminal 2 is realized mainly by the processor 11 and the storing unit 12. The start response unit 71 acquires the start information output by the payer terminal 1 from sound input to the microphone 18 and causes the speaker 17 of the store terminal 2 to output sound indicating an ACK signal responding to the start information. When the magnitude of the sound indicating the start information input to the microphone 18 is not within a predetermined range, the start response unit 71 causes the speaker 17 of the store terminal 2 to output sound indicating information for changing the volume of the sound output by the speaker 17 of the payer terminal 1 such that the magnitude of the sound falls within the predetermined range. More specifically, first, the sound input unit 79 acquires, on the basis of an instruction of the start response unit 71, input sound data of the PCM format obtained by converting the sound input to the microphone 18 (step S251). Subsequently, the start response unit 71 acquires information decoded by the extracting unit 78 and the decoding unit 77 on the basis of the input sound data. Subsequently, the start response unit 71 determines whether the information decoded from the acquire sound is the start information (step S252). When the information is not the start information (N in step S252), the start response unit 71 repeats the acquisition of data of the sound from step S251. When the information is the start information (Y in step S252), the start response unit 71 causes, using the encoding unit 75 and the sound output unit 76 of the store terminal 2, the speaker 17 to output sound indicating the ACK signal responding to the start information (step S253).

The sound input unit 69, the extracting unit 68, and the decoding unit 67 of the payer terminal 1 perform the above-mentioned receiving process concerning the sound input from the microphone 18 and determine whether received data is the ACK signal (step S152). When the ACK signal is not received (N in step S152), the process is repeated from the receiving process again. When the ACK signal is received (Y in step S152), processing by the payment-information transmitting unit 63 is performed. Note that, as in the first embodiment, the store terminal 2 may check the magnitude of sound and transmit a volume correction signal according to necessity. The payer terminal 1 may change volume according to the signal or the like.

The payment-information transmitting unit 63 of the payer terminal 1 is realized mainly by the processor 11 and the storing unit 12. The payment-information transmitting unit 63 acquires encrypted balance information, which is data indicating a payment account, stored in the storing unit 12 in advance (step S153). The payment-information transmitting unit 63 inputs the encrypted payment information to the encoding unit 65 and the sound output unit 66 as transmission data so as to transmit the encrypted balance information via sound (step S154).

Figure 21:
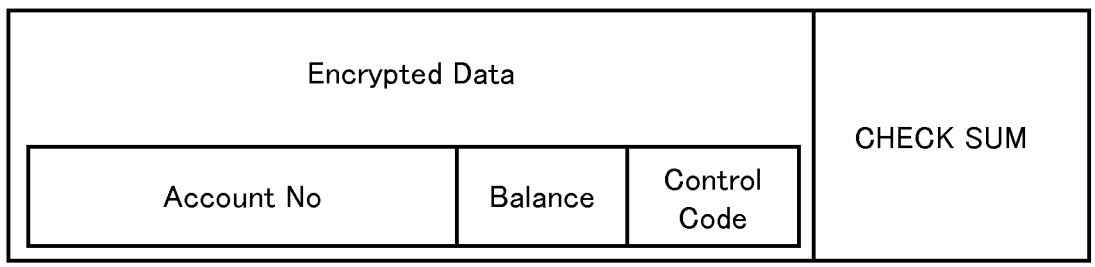
FIG. 21 is a diagram showing an example of encrypted balance information.

FIG. 21 is a diagram showing an example of the encrypted balance information. The encrypted balance information includes encrypted data (an encrypted section) and a check sum. The check sum is a kind of an error detection code for checking whether transfer of data is performed without a problem. The check sum is also included in other data communicated using the encoding units 65 and 75 and the decoding units 67 and 77 such as the start information and the payment account information in the first embodiment. The encrypted section is data obtained by encrypting an account number (Account No), balance information (Balance), and a control code (Control Code). The account number has 64-bit length, the balance information has 16-bit length, and the control code has 16-bit length. The control code is a value calculated from the account number, the balance information, or the like using a calculation method not open to the public. An outsider cannot generate the control code. The black box 4 side checks whether the control code is correct so as to detect falsification. Therefore, even if there is a person who attempts to falsify the encrypted balance information, the person has to acquire two kinds of secret information, i.e., the encryption key and the calculation method for the control code. Therefore, security is ensured.

The sound input unit 79, the extracting unit 78, and the decoding unit 77 of the store terminal 2 perform receiving process concerning the sound input from the microphone 18 and receive received data of the sound as the encrypted balance information (step S254).

The payment inquiring unit 72 of the store terminal 2 is realized mainly by the processor 11, the storing unit 12, and the communication unit 13. The payment inquiring unit 72 transmits the encrypted balance information, which is the data indicating the payment account, and a payment amount to the black box 4 (step S255).

The information receiving unit 81 of the black box 4 is realized mainly by the processor 11, the storing unit 12, and the communication unit 13. The information receiving unit 81 receives the encrypted balance information and the payment amount from the store terminal 2 (step S351).

The encryption decoding unit 92 of the black box 4 is realized mainly by the processor 11 and the storing unit 12. The encryption decoding unit 92 decodes the encrypted balance information using a secret key stored in the storing unit 12 and acquires a balance (step S352).

The balance updating unit 93 of the black box 4 is realized mainly by the processor 11 and the storing unit 12. When the balance is equal to or larger than the payment amount (Y in step S353), the balance updating unit 93 subtracts the payment amount from the balance to update the balance (step S355).

The encrypting unit 94 of the black box 4 is realized mainly by the processor 11 and the storing unit 12. The encrypting unit 94 encrypts information such as the updated balance and the account number using the secret key stored in the storing unit 12 and generates the encrypted balance information (step S356).

The payment-propriety reply unit 95 of the black box 4 is realized mainly by the processor 11 and the storing unit 12. The payment-propriety reply unit 95 transmits payment information indicating payment permission and the encrypted balance information obtained by encrypting the updated balance and so on to the store terminal 2 when the balance is equal to or larger than the payment amount (step S357). When the balance is smaller than the payment amount (N in step S353), the payment-propriety reply unit 95 transmits payment information indicating payment non-permission to the store terminal 2 (step S354). Note that plaintext information concerning a balance is also included in the payment information indicating payment permission. This balance is used by the payer terminal 1 to inform the user of the balance.

The result output unit 73 of the store terminal 2 is realized mainly by the processor 11 and the storing unit 12. The result output unit 73 receives the payment information, which is information indicating propriety of payment (a payment result) from the black box 4. In the case of payment permission, the result output unit 73 receives the encrypted balance information as well (step S256). The result output unit 73 transmits the payment information indicating the result of the payment to the payer terminal 1 (step S257). When the payment information indicates payment non-permission (N in step S258), the result output unit 73 ends the processing by the store terminal 2. When the payment information indicates payment permission (Y in step S258), the result output unit 73 sets the transmission data as the encrypted balance information and transmits the encrypted balance information to the payer terminal 1 using the encoding unit 75 and the sound output unit 76 (step S259). If a received notification is not received from the payer terminal 1 (N in step S260), the result output unit 73 repeats, from step S259, the process for transmitting the encrypted balance information to the payer terminal 1. When the received notification is received from the payer terminal 1 (Y in step S260), processing by the completion-information transmitting unit 74 is performed.

The payment-result acquiring unit 64 of the payer terminal 1 is realized mainly by the processor 11, the storing unit 12, and the display operation unit 14. The payment-result acquiring unit 64 receives the payment information using the sound input unit 69, the extracting unit 68, and the decoding unit 67 (step S155). When the payment information indicates payment non-permission (N in step S156), the payment-result acquiring unit 64 outputs a failure message via the display operation unit 14 (step S157). When the payment information indicates payment permission (Y in step S156), the payment-result acquiring unit 64 receives the encrypted balance information from the store terminal 2 using the sound input unit 69, the extracting unit 68, and the decoding unit 67 (step S158). Note that, if the encrypted balance information is not received (N in step S159), the payment-result acquiring unit 64 repeats the process from step S158. When the encrypted balance information is received (Y in step S159), the payment-result acquiring unit 64 transmits a received notification using the encoding unit 65 and the sound output unit 66 (step S161). Further, the payment-result acquiring unit 64 receives, using the sound input unit 69, the extracting unit 68, and the decoding unit 67, a payment success notification transmitted from the store terminal 2. If the payment success notification cannot be received for a fixed time (step S160), the payment-result acquiring unit 64 repeats transmitting the received notification in step S159. When the payment success notification is received (step S161), the payment-result acquiring unit 64 updates the old encrypted balance information stored in the storing unit 12 with the received encrypted balance information after the update (step S161). The payment-result acquiring unit 64 updates the plaintext information concerning the balance stored in the storing unit 12 with plaintext information concerning a balance included in the payment information and informs the user of the balance using the display operation unit 14.

The completion-information transmitting unit 74 of the store terminal 2 is realized mainly by the processor 11 and the storing unit 12. When the received notification is received from the payer terminal 1 (Y in step S260), the completion-information transmitting unit 74 causes the speaker 17 to output payment success sound and transmits a payment success notification to the payer terminal 1 (step S261). The completion-information transmitting unit 74 transmits a completion notification to the black box 4 (step S262).

The payment ending unit 96 of the black box 4 is realized mainly by the processor 11 and the storing unit 12. When the completion notification is received from the store terminal 2, the payment ending unit 96 performs ending process for storing the payment amount, the account number, and a use history of the balance in the storing unit 12, deleting the encrypted balance information and so on (step S358). The use history stored in the storing unit 12 is read out to the outside at timing of billing and transferred to a center, which manages payment, as information concerning charge for sales for requesting a payment company to pay the payment amount. The store terminal 2 confirms that the payer terminal 1 receives the encrypted balance information and, after the confirmation, stores the use history of the black box 4. Consequently, it is possible to suppress a discrepancy of information such as a balance when a problem occurs in a communication route.

According to the method explained above, if the user owns the payer terminal 1 that inputs and outputs sound using the DA converter 15 and the AD converter 16 like a smart phone or a cellular phone, it is possible to perform electronic payment of electronic money or the like. Note that deposit from the payer terminal 1 may be realized using the black box 4 or an external server. For example, the encrypted balance information added with a balance on the basis of deposit performed by the store terminal 4 may be transmitted from the black box 4 to the payer terminal 1. Note that a payment server having the function of the black box 4 and provided in common to stores may be provided instead of the black box 4. Then, it is also possible to manage a balance of an account on the payment server side as well and easily detect a fraudulent use. The payment server may provide a function for deposit.

The payer terminal 1 may be adapted to both of the store terminal 2 according to the first embodiment and the store terminal 2 according to the second embodiment. For example, when the store terminal 2 responds to the start information, the store terminal 2 may transmit information of a type of the store terminal 2 and select, according to the information of the type, whether process for handling the payment account information is performed or process for handling the encrypted balance information is performed thereafter. Note that the kinds of processing by the payer terminal 1 and the store terminal 2 explained above do not always have to be performed by the processor 11 and the storing unit 12 for general use. For example, these kinds of processing may be realized using an exclusively designed device such as an integrated circuit.

A communication procedure (a protocol) concerning payment between the payer terminal 1 and the store terminal 2 is not limited to those explained in the first embodiment and the second embodiment and may be other protocols. For example, the communication procedure may be a communication procedure in which the communication by a radio wave performed using the noncontact IC in the communication procedure used in the existing payment of electronic money is replaced with the communication performed using the inaudible sound explained above. More specifically, payment process only has to be performed by transmitting communication data for payment, which is generated under an OS operating on a noncontact IC such as Felica (registered trademark), as inaudible sound using the encoding unit 65 and the like and by processing the communication data for payment, which is decoded from the inaudible sound using the decoding unit 67 and the like, under the OS.

The invention claimed is:

1. A transmitter comprising:
   means for acquiring transmission data;
   an encoder for outputting output sound data of a PCM format obtained by encoding the transmission data, the output sound data indicating sound in an inaudible frequency band; and
   a sound output unit for causing a DA converter to convert the output sound data so as to cause a speaker to output sound corresponding to the output sound data, wherein
   the encoder outputs the output sound data such that the output sound data indicates sound having a plurality of sections with sound and soundless sections between the adjacent sections with sound according to the transmission data such that each of the plurality of sections with sound include an envelope wherein the envelope is in the shape of a sine curve where an amplitude of the sine curve increases from a start time and decreases after reaching a maximum amplitude.

2. The transmitter according to claim 1, wherein the encoder determines a time width of each of the plurality of sections with sound according to the transmission data and outputs output sound data indicating sound including the plurality of sections with sound.

3. The transmitter according to claim 2, wherein the time width of each of the plurality of sections with sound is any one of a predetermined number of time widths set in advance.

4. The transmitter according to claim 1, wherein the inaudible frequency band is equal to or higher than 20 kHz.

5. The transmitter according to claim 1, further comprising a start control unit for causing the speaker to output sound indicating a start of communication to receiver and for changing the magnitude of the sound that the sound output unit causes the speaker to output based on sound input to a microphone, the sound being sound of the receiver responding to the sound indicating the start of the communication.

6. The transmitter according to claim 1, further comprising a start control unit for causing, using the sound output unit, the speaker to output sound indicating a start of communication to receiver, and for, when sound of the receiver responding to the sound indicating the start of the communication is not recognized, changing magnitude of the sound that the sound output unit causes the speaker to output and causing the speaker to output the sound indicating the start of the communication to the receiver, repeatedly.

7. The transmitter according to any one of claim 1, wherein the transmission data includes data indicating a payment account to be transmitted to a receiver.

8. The transmitter according to claim 7, further comprising a payment-information acquiring unit for acquiring, based on a user ID, information indicating a payment account corresponding to the user ID via a network.

9. The transmitter according to claim 7, wherein information indicating the payment account comprises encrypted balance information of the payment account.

10. The transmitter according to claim 9, further comprising:
a payment-result acquiring unit for acquiring, after the speaker outputs sound corresponding to the information indicating the payment account, payment result information including updated and encrypted balance information of the payment account from the receiver.

11. A transmitting method comprising:
acquiring transmission data;
outputting output sound data of a PCM format obtained by encoding the transmission data, the output sound data being output sound data indicating sound in an inaudible frequency band; and
causing a DA converter to convert the output sound data so as to cause a speaker to output sound corresponding to the output sound data, wherein
the output sound data is output such that the output sound data indicates sound having a plurality of sections with sound and soundless sections between the adjacent sections with sound according to the transmission data such that each of the plurality of sections with sound include an envelope wherein the envelope is in the shape of a sine curve where an amplitude of the sine curve increases from a start time and decreases after reaching a maximum amplitude.

12. A receiver comprising:
a sound input unit for acquiring, via an AD converter, input sound data of a PCM format indicating sound in an inaudible frequency band input to a microphone and obtained by encoding transmission data, the sound having a plurality of sections with sound and soundless sections between the adjacent sections with sound according to the transmission data and wherein each of the plurality of sections with sound include an envelope wherein the envelope is in the shape of a sine curve where an amplitude of the sine curve increases from a start time and decreases after reaching a maximum amplitude;
an extracting unit for generating extracted sound data obtained by extracting the sound in the inaudible frequency band from the sound indicated by the input sound data; and
a decoder for decoding the transmission data based on the extracted sound data.

13. The receiver according to claim 12, wherein the decoder decodes the transmission data based on length of time of each of the plurality of sections with sound indicated by the extracted sound data, the plurality of sections with sound being input to the microphone in order.

14. The receiver according to claim 12, further comprising a start response unit for causing a speaker to output the sound input to the microphone, the sound indicating information for causing, when sound indicating that a transmitter starts communication satisfies a predetermined condition, the speaker to change magnitude of sound output by the transmitter.

15. The receiver according to claim 13, wherein
the transmission data includes data indicating a payment account, and
the receiver further comprises:
a payment inquiring unit for transmitting the data indicating the payment account and a payment amount to a balance management apparatus; and
a result output unit for outputting information indicating a result of payment based on information indicating propriety of payment received from the balance management apparatus.

16. The receiver according to claim 15, wherein
the data indicating the payment account includes encrypted balance information of the payment account, and
when information indicating payment permission is received from the balance management apparatus, the result output unit receives updated and encrypted balance information of the payment account from the balance management apparatus and transmits the received balance information to the mobile terminal.

17. The receiver according to claim 16, further comprising a completion-information transmitting unit for transmitting information indicating payment completion to the balance management apparatus when information indicating that the balance information is received from the mobile terminal is received after the updated and encrypted balance information of the payment account is transmitted to the mobile terminal.

18. The receiver according to claim 15, wherein, when information indicating payment permission is received from the balance management apparatus, the result output unit outputs, as information indicating a result of the payment, information for causing a speaker to output predetermined sound that a user can recognize.

19. A receiving method comprising:
acquiring, via an AD converter, input sound data of a PCM format based on sound in an inaudible frequency band input to a microphone and obtained by encoding transmission data, the sound having a plurality of sections with sound and soundless sections between the adjacent sections with sound according to the transmission data and
wherein each of the plurality of sections with sound include an envelope wherein the envelope is in the shape of a sine curve where an amplitude of the sine curve increases from a start time and decreases after reaching a maximum amplitude;

generating extracted sound data obtained by extracting the sound in the inaudible frequency band from the sound indicated by the input sound data; and decoding the transmission data based on the extracted sound data.

20. A communication system comprising a transmitter and a receiver, the transmitter including:
  means for acquiring transmission data;
  an encoder for outputting output sound data of a PCM format obtained by encoding the transmission data, the output sound data indicating sound in an inaudible frequency band; and
  a sound output unit for causing a DA converter to convert the output sound data so as to cause a speaker to output sound corresponding to the output sound data, and
the encoder outputting the output sound data such that the output sound data indicates sound having a plurality of sections with sound and soundless sections between the adjacent sections with sound according to the transmission data such that each of the plurality of sections with sound include an envelope wherein the envelope is in the shape of a sine curve where an amplitude of the sine curve increases from a start time and decreases after reaching a maximum amplitude, and the receiver including:
  a sound input unit for acquiring, via an AD converter, input sound data of a PCM format indicating sound output by the speaker and input to a microphone;
  an extracting unit for generating extracted sound data obtained by extracting the sound in the inaudible frequency band from the sound indicated by the input sound data; and
  a decoder for decoding the transmission data based on the extracted sound data.

21. A communication method comprising:

acquiring transmission data;

outputting output sound data of a PCM format obtained by encoding the transmission data, the output sound data indicating sound in an inaudible frequency band;

causing a DA converter to convert the output sound data so as to cause a speaker to output sound corresponding to the output sound data;

acquiring, via an AD converter, input sound data of a PCM format indicating sound output by the speaker and input to a microphone, generating extracted sound data obtained by extracting the sound in the inaudible frequency band from the sound indicated by the input sound data; and decoding the transmission data based on the extracted sound data, wherein the output sound data is output such that the output sound data indicates sound having a plurality of sections with sound and soundless sections between the adjacent sections with sound according to the transmission data such that each of the plurality of sections with sound include an envelope wherein the envelope is in the shape of a sine curve where an amplitude of the sine curve increases from a start time and decreases after reaching a maximum amplitude.

\* \* \* \* \*